US007496465B2

(12) United States Patent
Chirico et al.

(10) Patent No.: US 7,496,465 B2
(45) Date of Patent: Feb. 24, 2009

(54) APPARATUS AND METHOD FOR ACTUATOR PERFORMANCE MONITORING IN A PROCESS CONTROL SYSTEM

(75) Inventors: Salvatore Chirico, Burnaby (CA); Ron E. Beselt, Burnaby (CA)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/482,884

(22) Filed: Jul. 7, 2006

(65) Prior Publication Data

US 2008/0010035 A1 Jan. 10, 2008

(51) Int. Cl.
*G06F 19/00* (2006.01)

(52) U.S. Cl. .................................................... 702/117

(58) Field of Classification Search ................. 702/117; 324/500

See application file for complete search history.

(56) References Cited

U.S. PATENT DOCUMENTS 5,197,328 A 3/1993 Fitzgerald
6,745,107 B1 6/2004 Miller
2003/0080256 A1 5/2003 Urnes, Sr. et al.
2004/0236472 A1 11/2004 Junk et al.
2006/0007260 A1* 1/2006 Oku ............................ 347/19

FOREIGN PATENT DOCUMENTS

GB 2335244 A 9/1999

OTHER PUBLICATIONS http://mw1.merriam-webster.com/dictionary/production, p. 1.*
http://mw1.merriam-webster.com/dictionary/manufacture, p. 1.*
Valve Magazine, Fall 2004, vol. 16, No. 4, p. 34-39.*
David Forsyth et al., "Steambox Diagnostic Module," 88th Annual Meeting, PAPTAC, pp. B39-B43, 2002.

* cited by examiner

*Primary Examiner*—Tung S Lau
(74) *Attorney, Agent, or Firm*—Munck Carter, P.C.

(57) ABSTRACT

A method, apparatus, and computer program are provided for actuator performance monitoring. A test of an actuator in a process control system can be initiated, such as when a break in the operation of the actuator or a machine associated with the actuator is detected. The test could include providing a varying control signal (such as a varying pressure signal) to the actuator. A response of the actuator to the control signal is analyzed to determine if the actuator is suffering from one or more faults. Analyzing the response could include generating a first pressurization curve identifying how a pressure in the actuator varies over time in response to the pressure signal. Analyzing the response could also include comparing the first pressurization curve to a second pressurization curve, such as a baseline pressurization curve generated when the actuator was first commissioned in the process control system.

21 Claims, 19 Drawing Sheets

| LEGEND | |
|---|---|
| 100-PROCESS CONTROL SYSTEM | 116-DILUTION ACTUATORS |
| | 118-SLICE LIP ACTUATORS |
| 102-PAPER MACHINE | 120-STEAM ACTUATORS |
| 106-PERFORMANCE MONITOR | 122-REWET SHOWER ACTUATORS |
| 108-NETWORK | |
| 110-PAPER SHEET | 124-INDUCTION HEATING ACTUATORS |
| 112-REEL | |
| 114-HEADBOX | 126, 128 - SCANNERS |

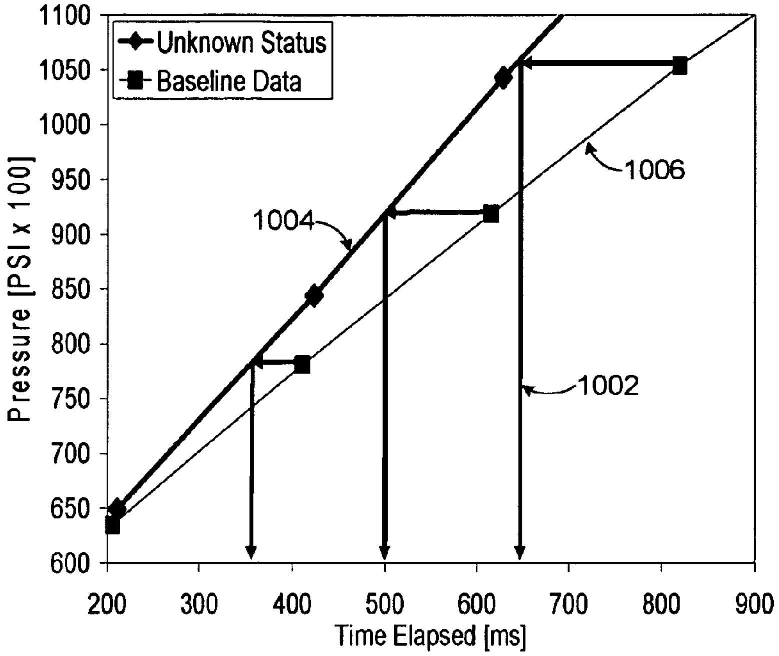
FIGURE 10
FIGURE 11
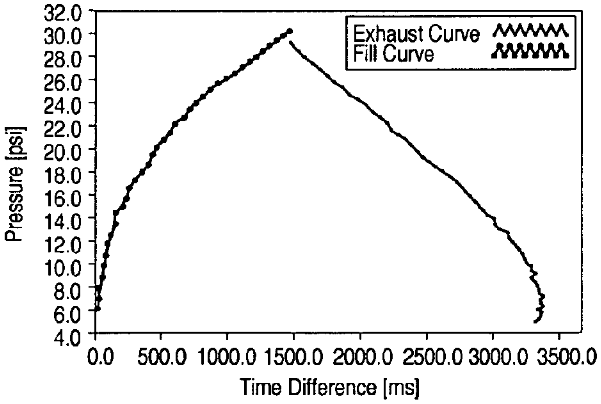
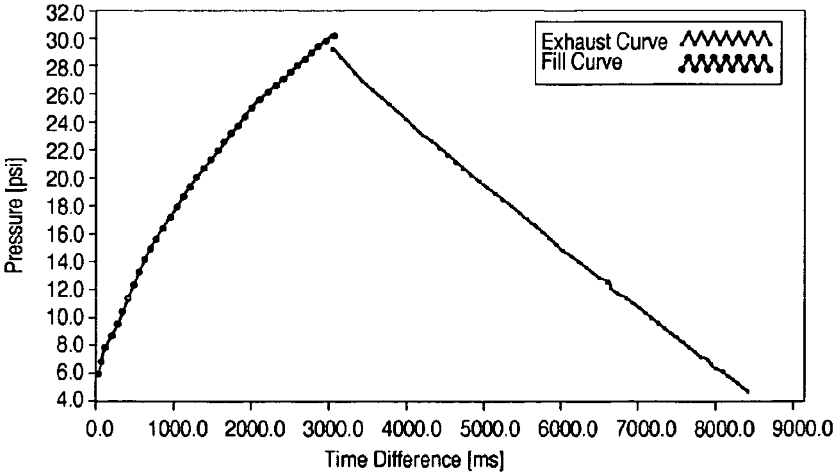
FIGURE 12

APPARATUS AND METHOD FOR ACTUATOR PERFORMANCE MONITORING IN A PROCESS CONTROL SYSTEM

TECHNICAL FIELD

This disclosure relates generally to control systems and more specifically to an apparatus and method for actuator performance monitoring in a process control system.

BACKGROUND

Processing facilities are often managed using process control systems. Example processing facilities include manufacturing plants, chemical plants, crude oil refineries, and ore processing plants. Among other operations, process control systems typically manage the use of valves, actuators, and other industrial equipment in the processing facilities.

In many conventional processing facilities, industrial equipment is often difficult to access, examine, and maintain. For example, in a paper production process, steam actuators are often located in a hostile environment within a paper machine. In order to access the steam actuators, maintenance or other personnel often must disassemble a portion of the paper machine, which is a time consuming, labor intensive, and expensive endeavor. As a result, it is often inconvenient or undesirable to have the maintenance or other personnel physically examine and determine the status of the steam actuators.

SUMMARY

This disclosure provides an apparatus and method for actuator performance monitoring in a process control system.

In a first embodiment, a method includes initiating a test of an actuator in a process control system. The test includes providing a varying control signal to the actuator. The method also includes analyzing a response of the actuator to the varying control signal to determine if the actuator is suffering from one or more faults. In addition, the method includes providing at least one notification identifying any identified faults.

In particular embodiments, the varying control signal could include a varying pressure signal. Also, analyzing the response of the actuator could include generating a first pressurization curve for the actuator. The first pressurization curve identifies how a pressure in the actuator varies over time in response to the varying pressure signal. Analyzing the response of the actuator could also include comparing the first pressurization curve to a second pressurization curve and generating a time difference plot based on the comparison. The time difference plot identifies how the first pressurization curve differs from the second pressurization curve over time. Analyzing the response of the actuator could further include analyzing the time difference plot to determine if the actuator is suffering from any faults. The second pressurization curve could include a baseline pressurization curve generated when the actuator was first commissioned in the process control system.

In a second embodiment, an apparatus includes at least one processor that is operable to initiate a test of an actuator in a process control system. The test includes providing a varying control signal to the actuator. The at least one processor is also operable to analyze a response of the actuator to the varying control signal to determine if the actuator is suffering from one or more faults. In addition, the at least one processor is operable to provide at least one notification identifying any identified faults.

In a third embodiment, a computer program is embodied on a computer readable medium and is operable to be executed by a processor. The computer program includes computer readable program code for initiating a test of an actuator in a process control system. The test includes providing a varying control signal to the actuator. The computer program also includes computer readable program code for analyzing a response of the actuator to the varying control signal to determine if the actuator is suffering from one or more faults. In addition, the computer program includes computer readable program code for providing at least one notification identifying any identified faults.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 5 through 37 illustrate example signal analyses for identifying actuator faults in accordance with this disclosure.

DETAILED DESCRIPTION

Figure 1:
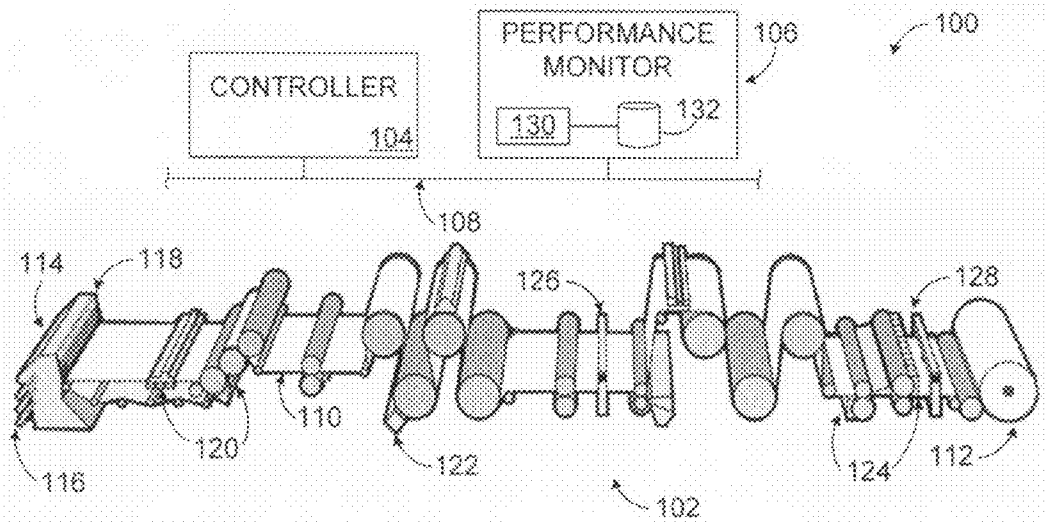
FIG. 1 illustrates an example process control system in accordance with this disclosure.

FIG. 1 illustrates an example process control system 100 in accordance with this disclosure. The embodiment of the process control system 100 shown in FIG. 1 is for illustration only. Other embodiments of the process control system 100 may be used without departing from the scope of this disclosure.

In this example embodiment, the process control system 100 includes a paper machine 102, a controller 104, an actuator performance monitor 106, and a network 108. The paper machine 102 includes various components used to produce a paper product. In this example, the various components may be used to produce a paper sheet 110 collected at a reel 112.

As shown in FIG. 1, the paper machine 102 includes a headbox 114, which distributes a pulp suspension uniformly across the machine onto a continuous moving wire screen or mesh. The pulp suspension entering the headbox 114 may contain, for example, 0.2-3% wood fibers and/or other solids, with the remainder of the suspension being water. The headbox 114 may include an array of dilution actuators 116, which distributes dilution water into the pulp suspension across the sheet. The dilution water may be used to help ensure that the resulting paper sheet 110 has a more uniform basis weight across the sheet. The headbox 114 may also include an array of slice lip actuators 118, which controls a slice opening across the machine from which the pulp suspension exits the headbox 114 onto the moving wire screen or mesh. The array of slice lip actuators 118 may also be used to control the basis weight of the paper sheet 110.

Arrays of steam actuators 120 produce hot steam that penetrates the paper sheet 110 and releases the latent heat of the steam into the paper sheet 110, thereby increasing the temperature of the paper sheet 110. The increase in temperature may allow for easier removal of water from the paper sheet 110. The steam actuators 120 could, for example, represent actuators in a DEVRONIZER STEAM BOX from HONEYWELL INTERNATIONAL INC. An array of rewet shower actuators 122 adds small droplets of water (which may be air atomized) onto the surface of the paper sheet 110. The array of rewet shower actuators 122 may be used to control the moisture profile of the paper sheet 110, reduce or prevent over-drying of the paper sheet 110, or correct any dry streaks in the paper sheet 110.

The paper sheet 110 is then passed through several nips of counter-rotating rolls. An array of induction heating actuators 124 heats the shell surface of an iron roll across the machine. As the roll surface locally heats up, the roll diameter is locally expanded and hence increases nip pressure, which in turn locally compresses the paper sheet 110. The array of induction heating actuators 124 may therefore be used to control the caliper (thickness) profile of the paper sheet 110. Additional components could be used to further process the paper sheet 110, such as a supercalender for improving the paper sheet's thickness, smoothness, and gloss.

This represents a brief description of one type of paper machine 102 that may be used to produce a paper product. Additional details regarding this type of paper machine 102 are well-known in the art and are not needed for an understanding of this disclosure. Also, this represents one specific type of paper machine 102 that may be used in the process control system 100. Other machines or devices could be used that include any other or additional components for producing a paper product. In addition, this disclosure is not limited to use with systems for producing paper products and could be used with systems that produce other items or materials, such as plastic, textiles, metal foil or sheets, or other or additional materials.

The controller 104 is capable of controlling the operation of the paper machine 102. For example, the controller 104 may control the operation of the various actuators in the paper machine 102. As a particular example, the steam actuators 120 could represent pneumatic actuators, and the controller 104 could provide pneumatic air control signals to the steam actuators 120. The controller 104 includes any hardware, software, firmware, or combination thereof for controlling the operation of at least part of the paper machine 102. In some embodiments, the controller 104 operates using measurement data from one or more scanners 126-128, each of which may include a set of sensors. The scanners 126-128 are capable of scanning the paper sheet 110 and measuring one or more characteristics of the paper sheet 110, such as the weight, moisture, caliper, gloss, smoothness, or any other or additional characteristics of the paper sheet 110. Each of the scanners 126-128 includes any suitable structure or structures for measuring or detecting one or more characteristics of the paper sheet 110, such as sets or arrays of sensors.

The actuator performance monitor 106 is capable of testing the operation of various actuators in the paper machine 102. The actuator performance monitor 106 is also capable of analyzing the test results, identifying any faults with the tested actuators, and generating alarms or other notifications when faults are detected. For example, the actuator performance monitor 106 (through interaction with the controller 104) could test the operation of the steam actuators 120 in the paper machine 102 and compare the current test results to previous test results. The previous test results could have been generated, for instance, when the steam actuators 120 were first installed in the paper machine 102. The previous test results may establish a baseline for the tested actuators, and the actuator performance monitor 106 can determine how the tested actuators' current performance differs from their previous performance.

The actuator performance monitor 106 could perform any suitable test(s) to determine the current performance abilities of the actuators in the paper machine 102. For example, the controller 104 could represent a pneumatic controller that provides control signals to the actuators in the form of air pressure signals. The actuator performance monitor 106 could cause the controller 104 to increase the air pressure signal to an actuator and then decrease the air pressure signal to the actuator, and the actuator performance monitor 106 could monitor the resulting behavior of the actuator.

The actuator performance monitor 106 could then analyze the test results to determine if the actuators suffer from one or more faults. For example, the actuator performance monitor 106 could determine if a steam actuator is suffering from excessive sticking and slipping, seizure (valve is stuck), or hysteresis. The actuator performance monitor 106 could also determine if a component in the actuator has failed (such as a broken return spring) or if the actuator is suffering from excessive backpressure. The actuator performance monitor 106 could further determine if a tube carrying a pneumatic control signal for the actuator is leaking or blocked. In addition, the actuator performance monitor 106 could detect mechanical changes to the process control system 100 that affect an actuator. The actuator performance monitor 106 could detect any other or additional faults with an actuator or group of actuators.

The following represents specific details of a particular implementation of the process control system 100 and the actuator performance monitor 106. These details are for illustration only. Other process control systems 100 or actuator performance monitors 106 that operate in different ways could be used without departing from the scope of this disclosure.

In some embodiments, the actuator performance monitor 106 may initiate an actuator test upon detecting that the actuators to be tested or the paper machine 102 is no longer being used to produce a paper sheet 110. For example, the actuator performance monitor 106 could detect when the paper sheet 110 has broken or torn, which halts production of the paper sheet 110. At this point, the actuator performance monitor 106 can initiate testing of the actuators. This may help to ensure that testing of the actuators does not interfere with the regular operation of the paper machine 102.

In particular embodiments, the controller 104 represents an intelligent controller, such as an INTELLIGENT DISTRIBUTED PNEUMATIC ("IDP") CONTROLLER from HONEYWELL INTERNATIONAL INC. This type of controller 104 could include binary solenoid valves and an accurate and sensitive pressure sensor. The controller 104 may control a bank of pneumatically controlled actuators, such as eight A7 steam actuators from HONEYWELL INTERNATIONAL INC. These actuators vary the amount of steam applied to a paper sheet 110 depending on pneumatic control signals from the controller 104. Each pneumatic actuator may have a characteristic curve, such as a curve generated by plotting the actuator's output pressure versus time. This relationship is generally linear and can be written as:

$$P*A=K*x$$

where P represents pressure, A represents area, K is a constant, and x is a displacement.

As a particular example, an actuator 120 can be controlled using a pressure that varies from 6 psi to 30 psi. At 6 psi, the actuator could be fully opened, allowing a maximum amount of steam to flow through a screen plate onto the paper sheet 110. At 30 psi, the actuator could be fully closed, allowing little or no steam to pass through the screen plate. To test this actuator, the actuator's pneumatic control signal can be increased from approximately 6 psi to approximately 30 psi (during a "fill" stage) and then decreased to approximately 6 psi (during an "exhaust" stage), where the increase and decrease occur in small pulse durations. A pulse duration represents the time that a solenoid valve in the controller 104 is opened. The actuator performance monitor 106 could monitor the pressure before opening the solenoid valve, the time the solenoid valve was actually opened, and the pressure after the solenoid valve has closed.

Based on the data collected during the fill and exhaust stages of the test, a pressurization curve can be generated, where the pressure measured after each pulse is plotted on a pressure versus time graph. This pressurization curve can be used to detect a faulty actuator. For example, the pressurization curve can be analyzed to determine if the actuator suffers from excessive sticking and slipping, is stuck, has a broken spring, has a high level of moisture in its pneumatic control line, has a plugged screen plate, or exhibits a high level of hysteresis. As a particular example, upon commissioning (first activation) of an actuator, a baseline pressurization curve for the actuator can be generated and stored. During later tests (such as after the actuator has been in service for a certain length of time), the maximum value of the pressurization curve or the shape of the pressurization curves could change, and these changes could be used to identify an actuator fault.

In particular embodiments, these changes are detected by generating a time difference plot. A time difference plot can be constructed by subtracting the time value at a certain pressure on the current pressurization curve from the time value at the same pressure on the baseline pressurization curve.

Among other things, time difference plots can amplify shape changes between two pressurization curves, such as those shape changes that are caused by faults in the actuator. For instance, an actuator that has a broken return spring could have a time difference plot with a decreasing time difference value (negative return effect) during the exhaust stage. Also, an actuator that sticks and slips could generate discontinuities in the pressurization curve or the time difference plot.

An actuator that has moisture in its control line may produce the same effect that is caused by a higher temperature (which can reduce overall volume). While temperature may affect the pressurization curve greatly, this can be accounted for by scaling the current pressurization curve by a number that minimizes the width of the time difference plot. Moreover, if the widths of the time difference plots for multiple actuators are plotted on the same graph for a full array of actuators (such as 96 actuators on a beam), problems with certain sections of the beam can be identified. A plugged screen plate, for example, may cause multiple consecutive actuators, such as four or more, to appear faulty.

Finally, hysteresis of an actuator can be calculated by filling and then exhausting the actuator in varying pulse lengths, such as pulse lengths that start at 0 milliseconds and increase by 4 milliseconds up to 1,000 milliseconds or until the actuator starts moving. Initially, the actuator may not move, but after a certain pulse length it starts to move. The difference in pressure between a consecutive fill and exhaust pulse is plotted, displaying the observable release point.

The actuator performance monitor 106 includes any hardware, software, firmware, or combination thereof for monitoring and analyzing the performance of one or more actuators. The actuator performance monitor 106 could, for example, include one or more processors 130 and one or more memories 132 capable of storing data and instructions (such as software, recorded test results, and test result analyses) used by the processor(s) 130. As a particular example, the actuator performance monitor 106 could represent software implemented using the LABVIEW programming language from NATIONAL INSTRUMENTS CORPORATION. Additional information regarding the operation of the actuator performance monitor 106 is provided in the remaining figures, which are described below.

The network 108 facilitates communication between components of the process control system 100. For example, the network 108 may communicate control signals from the controller 104 to the actuators in the paper machine 102. The network 108 may represent any suitable type of network or networks for transporting signals between various components of the process control system 100, such as a communication network or a network of pneumatic air tubes.

Although FIG. 1 illustrates one example of a process control system 100, various changes may be made to FIG. 1. For example, the process control system 100 could include any number of paper machines, controllers, actuator performance monitors, and networks. Also, other systems could be used to produce paper products or other products. Further, the makeup and arrangement of the process control system 100 is for illustration only. Components could be added, omitted, combined, or placed in any other suitable configuration according to particular needs. As a particular example, a controller 104 and the actuator performance monitor 106 could be combined into a single physical unit, such as when the actuator performance monitor 106 is implemented by the controller 104. In addition, while the controller 104 and the actuators have been described as being pneumatic devices, other types of controllers and actuators could be used. As an example, electric controllers and actuators could be used, and the current/voltage characteristics of the control signals sent to the actuators could be analyzed to identify faulty actuators.

Figure 2:
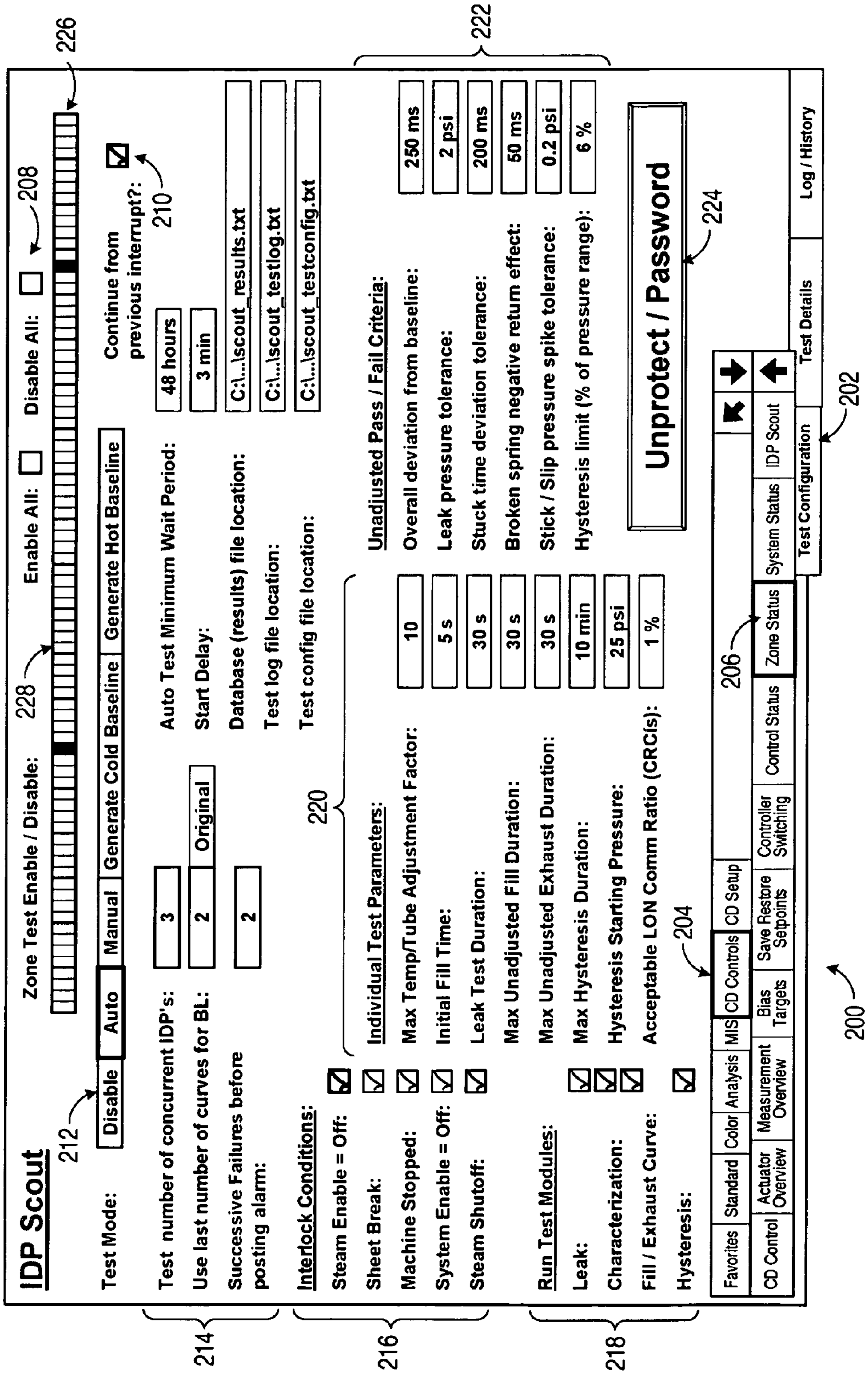
FIGS. 2 through 4 illustrate an example graphical user interface for actuator performance monitoring in a process control system in accordance with this disclosure.
Figure 3:
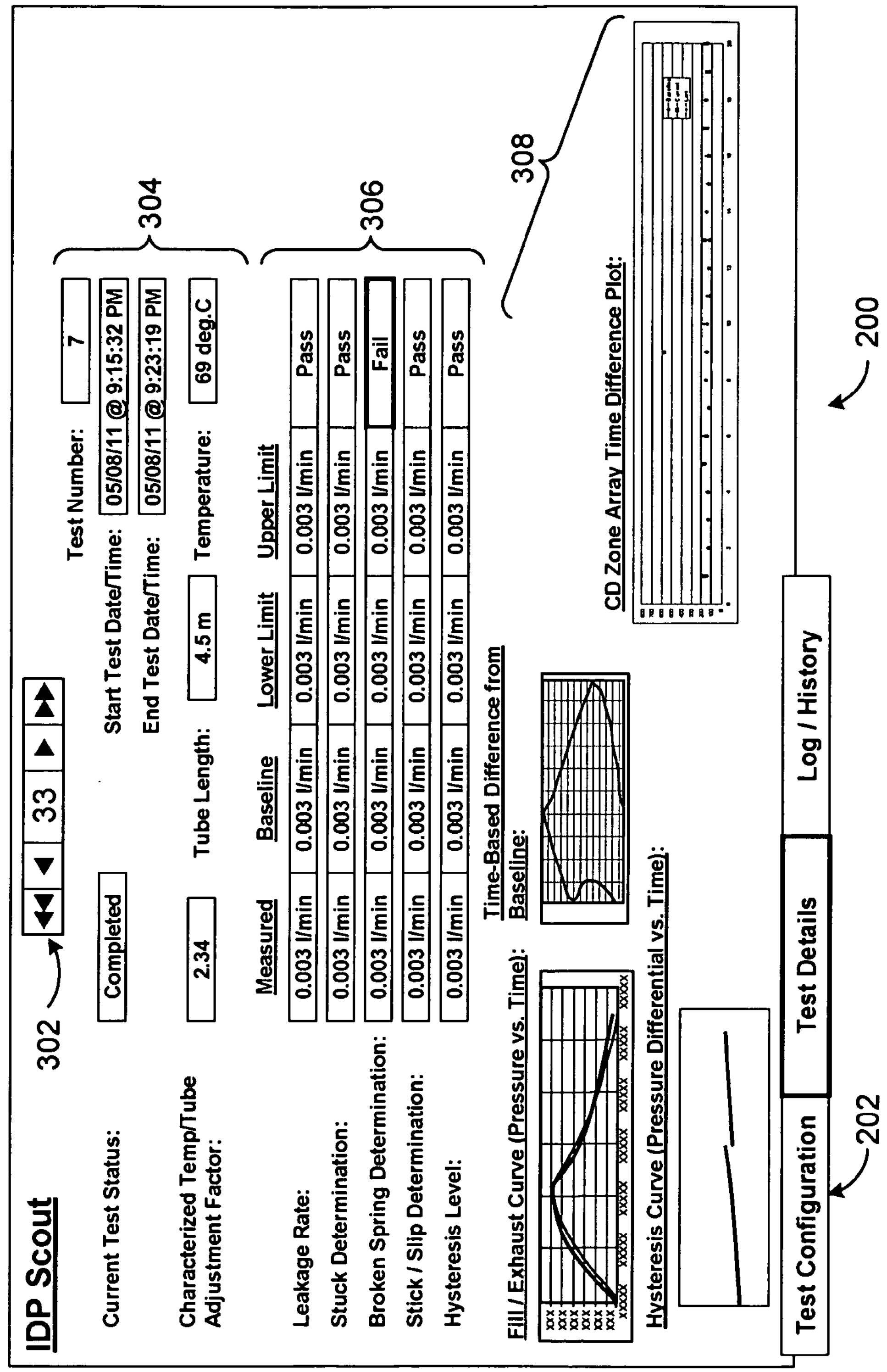
Figure 4:
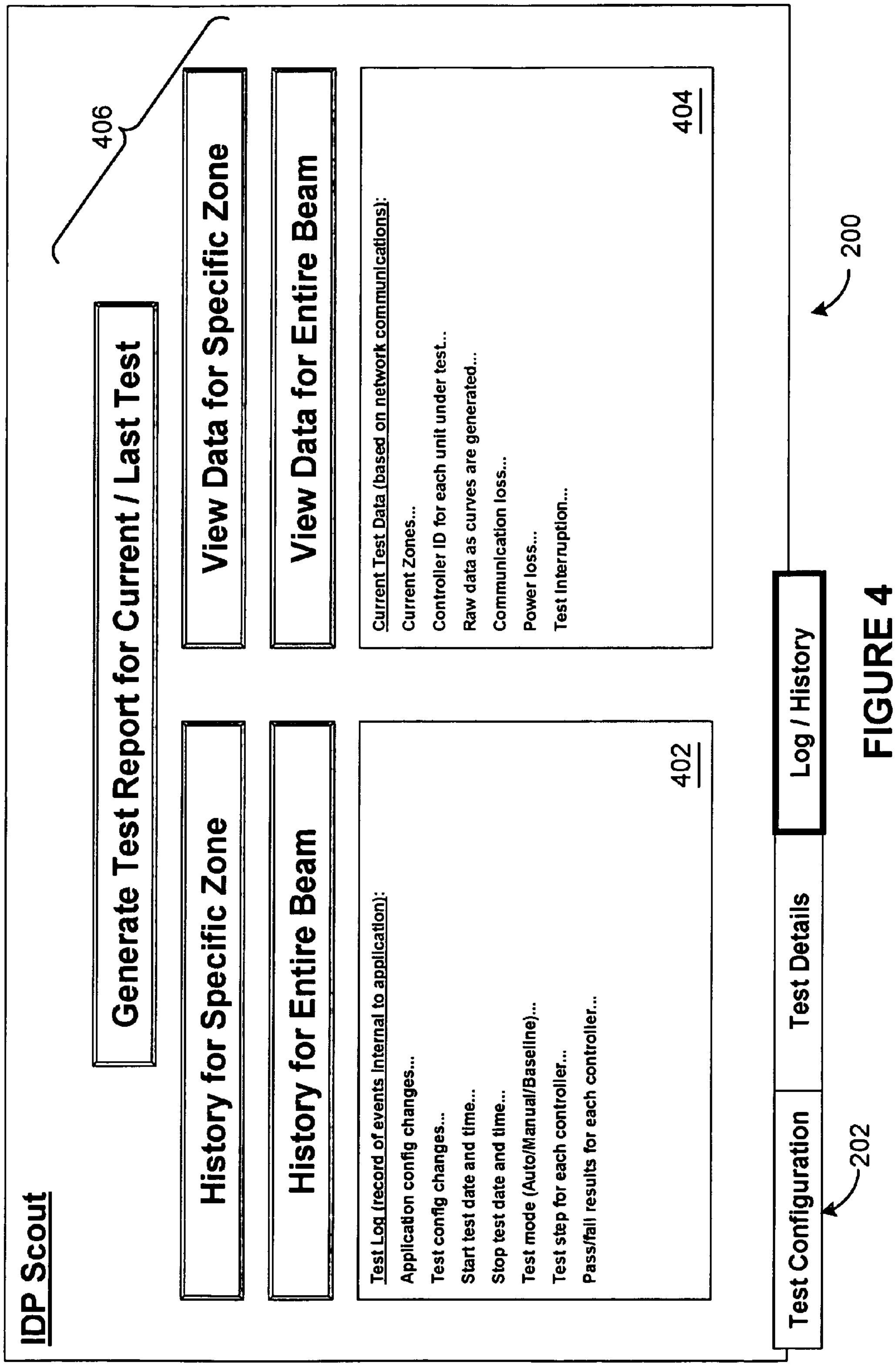

FIGS. 2 through 4 illustrate an example graphical user interface 200 for actuator performance monitoring in a process control system in accordance with this disclosure. The embodiment of the graphical user interface 200 shown in FIGS. 2 through 4 is for illustration only. Other embodiments of the graphical user interface 200 could be used without departing from the scope of this disclosure. Also, for ease of explanation, the graphical user interface 200 is described as being used with the actuator performance monitor 106 in the process control system 100 of FIG. 1. The graphical user interface 200 could be used with any other suitable device and in any other suitable system.

In general, the graphical user interface 200 presents information to a user regarding the operation of the actuator performance monitor 106. In this example, the graphical user interface 200 includes three tabs 202, which can be selected to display different information in the graphical user interface 200. For example, the tabs 202 can be used to present information related to the configuration of an actuator performance test, details of the current or most recent actuator performance test, and past actuator performance tests.

Selection of the "Test Configuration" tab 202 presents information in the graphical user interface 200 as shown in FIG. 2. In this example, this information includes a set of tabs 204 including a "CD Controls" tab (where "CD" stands for "cross direction"), the selection of which presents another set of tabs 206. One of these tabs 206 is a "Zone Status" tab 206, which presents information in the graphical user interface 200 allowing the user to configure an actuator performance test.

As shown in FIG. 2, the test configuration information includes two checkboxes 208, which allow the user to enable or disable a performance test for all of the actuators. A checkbox 210 indicates whether a test, when initiated, should start over or continue where a previous test was interrupted. Various test mode selection buttons 212 identify how an actuator performance test can be initiated. For example, an actuator performance test can be disabled, initiated automatically upon detecting a break in the operation of the paper machine 102, or initiated manually. Also, two special types of baseline tests could be initiated manually, namely a "cold" baseline test and a "hot" baseline test. The baseline tests establish baselines used during later tests to identify faults in the actuators being tested. The "hot" and "cold" baseline tests are associated with hotter and colder operating temperatures during the tests of the steam actuators 120. The tests could take place while the actuators 120 are still hot from the process or after an unknown period of time where they have cooled to room temperature.

Options 214 control various miscellaneous aspects of an actuator performance test. For example, the user can identify how many controllers may be concurrently used during the actuator performance test (such as IDP controllers that control eight actuators each). The user can also identify whether the current performance of an actuator should be compared to the actuator's original baseline test results or to one or more of the most recent test results. The user can further identify how many consecutive tests an actuator should fail before a fault in the actuator is identified. The user can also specify the minimum amount of time that should elapse between successive tests of an actuator (so the actuator is not repeatedly tested in a short period of time) and the time delay between initiation of a test and the actual start of the test. In addition, the user can specify different file locations, such as the locations of a configuration file, test results file, and log file.

Test initiation options 216 control when an actuator performance test is initiated automatically. For example, a test can be initiated when a "Steam Enable" flag is set to "Off," indicating that the use of steam by the steam actuators 120 has been disabled. The test can also be initiated when a paper sheet 110 being produced has broken or when production by the paper machine 102 has stopped. The test can further be initiated when a "System Enable" flag is set to "Off," indicating that use of the paper machine 102 has been disabled. In addition, the test could be initiated when steam supplied to the paper machine 102 has been shut off.

Test options 218 identify the types of tests to be performed during an actuator performance test. An actuator performance test could involve a single test or multiple tests that test one or multiple aspects of an actuator. These tests include a control signal leakage test and a characterization test, which could involve filling the actuator from 6 psi to 30 psi and back down to 6 psi. The fill/exhaust curve option allows the user to skip the exhaust stage (such as by skipping the slow decrease in the actuator pressure from 30 psi to 6 psi). The options further allow the user to select a hysteresis test. Additional details about these different tests are provided below.

Test parameters 220 identify different parameters involved in one or more of the individual actuator tests. For example, the test parameters 220 could include a maximum temperature or tube length adjustment factor. Temperature and tubing length affect the speed of an actuator's response to test parameters, so a multiplier or correction factor is used to compensate. The adjustment factor could be generated by a characterization test, which is described in more detail below. The test parameters 220 may also include a time period for filling an actuator and a duration of a leak test, where the actuator pressure is measured before and after this duration. The test parameters 220 could further include maximum time periods for the fill and exhaust stages of a test, which can be used to invoke timeouts of a test. The test parameters 220 could also include a maximum duration and a starting pressure for a hysteresis test. In addition, the test parameters 220 could include a value identifying the Cyclic Redundancy Check (CRC) value used for error checking of a communication signal in a local operating network.

Pass/fail criteria 222 allow the user to define parameters that determine whether an actuator is suffering from a particular fault. For example, the user could allow an actuator response time to vary from a baseline by up to a specified number of milliseconds before identifying an actuator failure. Similarly, the user could define a specified tolerance (in psi) for identifying an actuator with a leaking control line, a specified tolerance (in milliseconds) for identifying an actuator with a stuck valve, and a specified tolerance (in milliseconds) for identifying an actuator with a broken spring. In addition, the user could define a specified tolerance (in psi) for identifying excessive sticking and slipping and a specified tolerance (in percent) for identifying hysteresis problems.

A security button 224 allows the user to set or remove a password or other security feature that controls access to the values in the graphical user interface 200. For example, a single password could be required before values in the graphical user interface 200 can be viewed or modified, or different passwords could provide different access to the values in the graphical user interface 200.

A test summary 226 identifies the test results for a current or most recent test. In this example, the test summary 226 includes an array of visual indicators 228, which could represent color-coded rectangular areas. In this embodiment, each of the visual indicators 228 could be associated with a different actuator in an actuator array, such as an individual steam actuator 120 in a beam of steam actuators. As a particular example, a green visual indicator 228 could indicate that a particular actuator passed all tests (no faults detected), a red visual indicator 228 could indicate that a particular actuator failed at least one test (at least one fault detected), and a grey visual indicator 228 could indicate that a particular actuator has not been tested. A flashing visual indicator 228 or a visual indicator 228 with another color could identify the current actuator being tested.

Selection of the "Test Details" tab 202 in the graphical user interface 200 could present the information shown in FIG. 3 to the user. As shown in this example, the graphical user interface 200 includes an actuator selector 302, which allows the user to select a particular actuator in an actuator array. Information about the selected actuator may then be displayed in the remaining portion of the graphical user interface 200.

A test summary section 304 summarizes various miscellaneous aspects of an actuator performance test. For example, the test summary section 304 could identify the current status of a performance test for an actuator, a test number for the test, and start and stop times for the test. The test summary section 304 could also identify a temperature or tube adjustment factor, a length of a tube carrying control signals to the actuator, and a temperature associated with the actuator.

A test results section 306 identifies the test results for an actuator. For example, the test results section 306 may identify the leakage rate for an actuator or a control line associated with the actuator. The test results section 306 can also identify values used to determine whether a valve in the actuator is stuck, whether a spring in the actuator is broken, or whether the actuator is suffering from excessive sticking and slipping. Further, the test results section 306 could identify values used to determine if the actuator is suffering from hysteresis. In addition, the test results section 306 could indicate whether an actuator passed or failed each individual test of the actuator performance test.

A plots section 308 contains various plots or graphs that are based on data obtained during the actuator performance test. For example, the plots section 308 could contain a plot of a pressurization curve (on a pressure versus time graph) and a hysteresis curve (on a pressure differential versus time graph). The plots section 308 could also contain time difference plots, such as a plot of the time-based differences between current and baseline test results and a plot of cross-direction zone array time differences.

Selection of the "Log/History" tab 202 in the graphical user interface 200 could present the information shown in FIG. 4 to the user. As shown in this example, the graphical user interface 200 includes a log area 402, which contains a set of hyperlinks that can be selected by the user. Selection of one of the hyperlinks in the log area 402 could present information to the user regarding general aspects or events associated with the most recent actuator performance test. These aspects or events could include application or test configuration changes, start and stop times and dates, a test mode (what initiated the test), the test step(s) performed for each controller, and the pass/fail results for each controller.

Similarly, the graphical user interface 200 includes a test data area 404, which includes a set of hyperlinks that can be selected by the user. Selection of one of the hyperlinks in the test data area 404 could present more detailed information to the user regarding the actuator performance test. For example, the detailed information could include the current zone(s) being tested, an identifier for each controller involved in the test, and raw data collected during the test. The detailed information may also identify any communication losses, power losses, or test interruptions that occur during the test.

In addition, the graphical user interface 200 includes log/history buttons 406, which can be selected by the user to view various reports or other data associated with current or previous actuator performance tests. For example, the log/history buttons 406 could be selected to generate a report associated with the current or most recent actuator performance test. The log/history buttons 406 could also allow the user to view the testing data or the testing history for a specific zone (which is associated with one or more actuators). In addition, the log/history buttons 406 could allow the user to view the testing data or the testing history for an entire beam of actuators. The reports or other data could be provided in any suitable manner, such as in ADOBE PDF or MICROSOFT WORD documents.

By using the graphical user interface 200 to interact with the actuator performance monitor 106, the user can specify how actuator performance tests should be conducted in the process control system 100. The user can define when the actuator performance tests are initiated and what occurs during the actuator performance tests. The user can also define criteria used to determine whether actuators pass or fail certain tests. In addition, the user can review the results of the current or most recent actuator performance test or a history of actuator performance test results. In this way, the user can design, implement, monitor, and review a testing strategy for actuators in a process control system, such as the steam actuators 120 in the paper machine 102. This allows the user to more effectively monitor the performance of the actuators and determine if and when maintenance for the actuators is required.

Although FIGS. 2 through 4 illustrate one example of a graphical user interface 200 for actuator performance monitoring in a process control system, various changes may be made to FIGS. 2 through 4. For example, the content and arrangement of the information in FIGS. 2 through 4 is for illustration only. The graphical user interface 200 could include any other or additional information arranged in any suitable manner. Also, the specific tests, initiation conditions, test parameters, pass/fail criteria, and other contents of the graphical user interface 200 are for illustration only. The graphical user interface 200 could allow the user to select or specify other tests, initiation conditions, test parameters, pass/fail criteria, and any other or additional characteristics of an actuator performance test.

FIGS. 5 through 37 illustrate example signal analyses for identifying actuator faults in accordance with this disclosure. The signals and the associated analyses shown in FIGS. 5 through 37 are for illustration only. Any other or additional signals and analyses could be used to identify actuator faults without departing from the scope of this disclosure. Also, for ease of explanation, these signals and analyses are described with respect to the actuator performance monitor 106 operating in the process control system 100 of FIG. 1. These signals and analyses could be used in any other suitable device or system.

Figure 5:
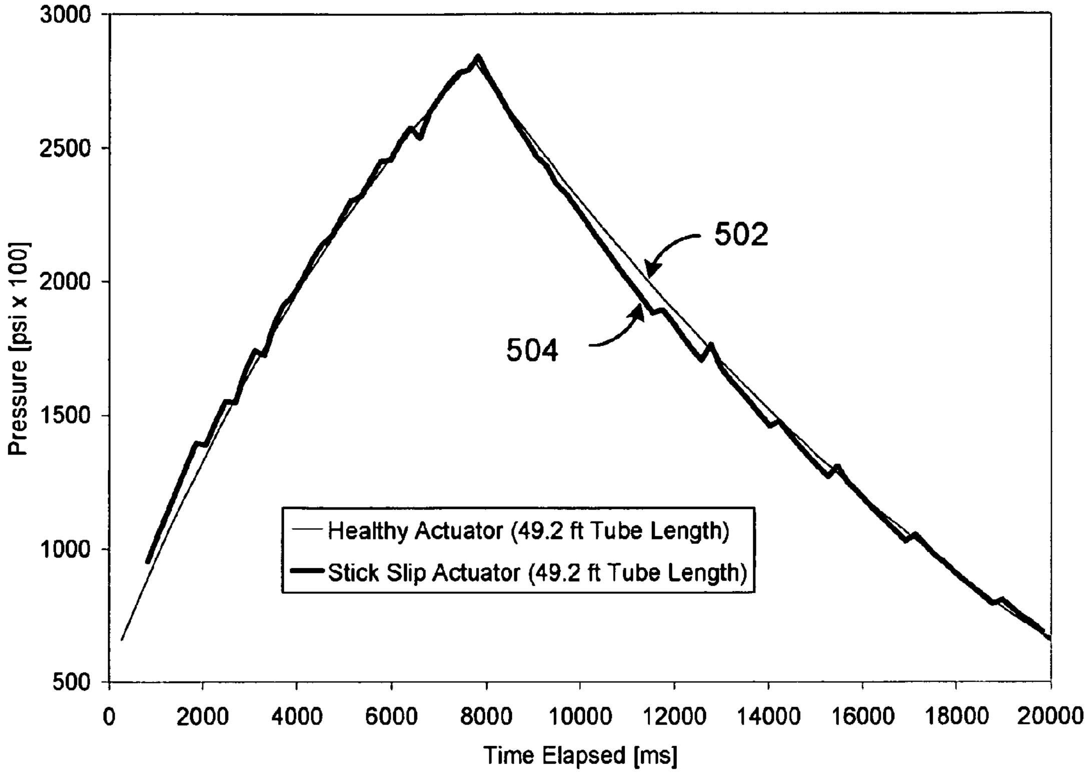
Figure 9:
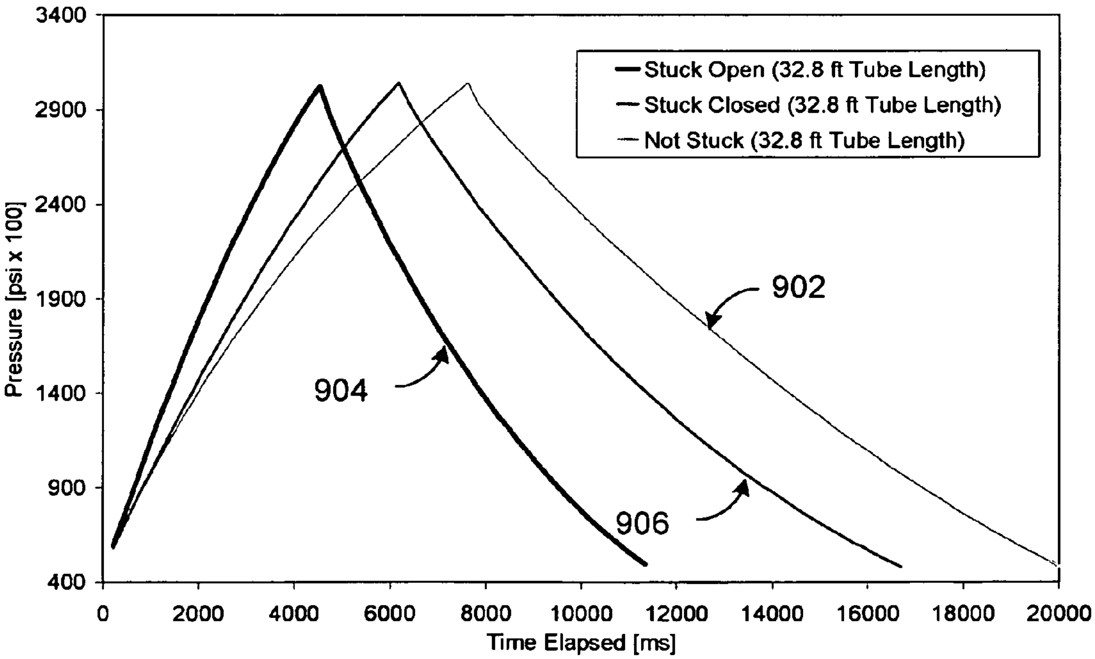

One possible fault experienced by an actuator is excessive sticking and slipping, meaning the actuator sticks and slips rather than opening and closing smoothly. An actuator suffering from excessive sticking and slipping generally has an irregular pressurization curve with pressure spikes of various magnitudes. The pressure spikes are caused by increases or decreases in the pressure of the control signal supplied to the actuator, without the expected or desired change in the actuator. The pressure spikes can be identified by comparing the actuator's performance to an actuator exhibiting smooth operation. As shown in FIG. 5, a pressurization curve 502 is generally smooth, while a pressurization curve 504 has a noticeable smoothness change compared to the pressurization curve 502. In this example, the pressurization curve 502 could be associated with a normal or "healthy" actuator, while the pressurization curve 504 could be associated with an actuator suffering from excessive sticking and slipping.

To identify when an actuator is suffering from excessive sticking and slipping, the actuator performance monitor 106 could take the raw pressurization curve data and select two polynomial curves that best fit the data. One polynomial curve is generally increasing during the "fill" phase of the test, and the other polynomial curve is generally decreasing during the "exhaust" phase of the test. Each selected polynomial curve could be the curve with the least mean squared error (when compared to the raw data during the appropriate test phase), and each polynomial curve may have an order ranging from the first to the sixth order. From here, the deviation between the selected polynomial curves and the raw data is measured, and an actuator that suffers from excessive sticking and slipping may have a large deviation.

Figure 6:
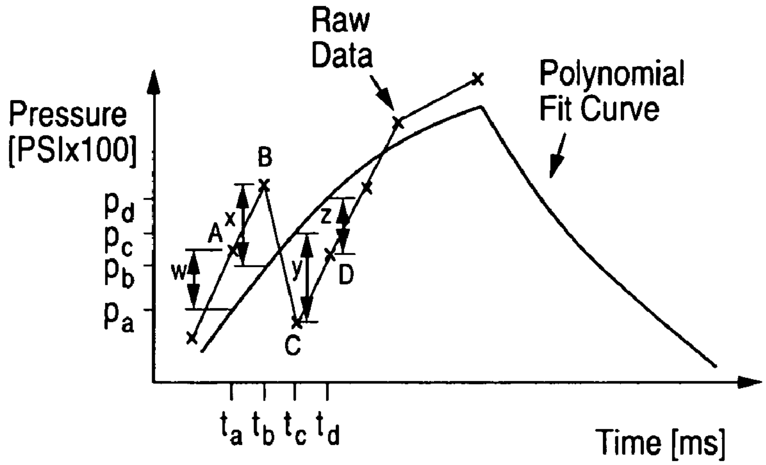

The actuator performance monitor 106 could measure the deviation between the raw pressurization curve data and the polynomial fits as shown in FIG. 6. In this example, for each of the two polynomial curves selected above, the actuator performance monitor 106 identifies the points where the raw data differs the most (has the largest vertical magnitude in psi) from that polynomial curve. For example, the actuator performance monitor 106 could subtract the polynomial fit pressure values (such as $p_a$, $p_b$, $p_c$, and $p_d$) at times $t_a$, $t_b$, $t_c$, and $t_d$, respectively, from the raw data pressure points at the same times. During the "fill" phase in this example, the first raw data point (A) has a vertical deviation from the polynomial fit denoted "w," and the second raw data point (B) has a vertical deviation from the polynomial fit denoted "x." The third raw data point (C) has a vertical deviation from the polynomial fit denoted "y," and the fourth raw data point (D) has a vertical deviation from the polynomial fit denoted "z." Examining the raw data points in any order (such as sequential), the actuator performance monitor 106 identifies the single largest positive vertical deviation and the single largest negative vertical deviation of the data from the polynomial curve during the "fill" phase. The actuator performance monitor 106 similarly identifies the single largest positive vertical deviation and the single largest negative vertical deviation of the data from the other polynomial curve during the "exhaust" phase. These four values can be added together, and excessive sticking and slipping could be identified if the sum exceeds a threshold value (such as a value of 0.7 psi).

Figure 7:
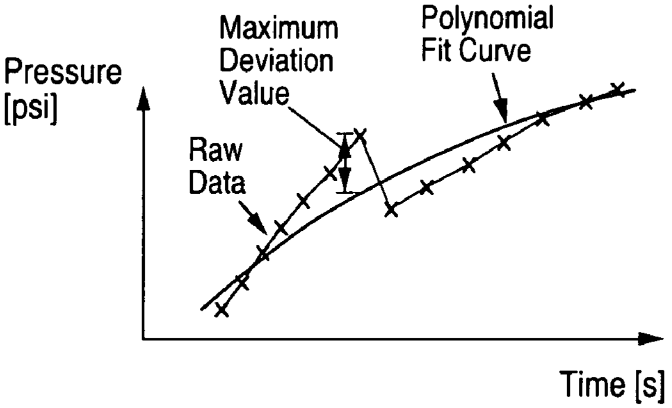
Figure 8:
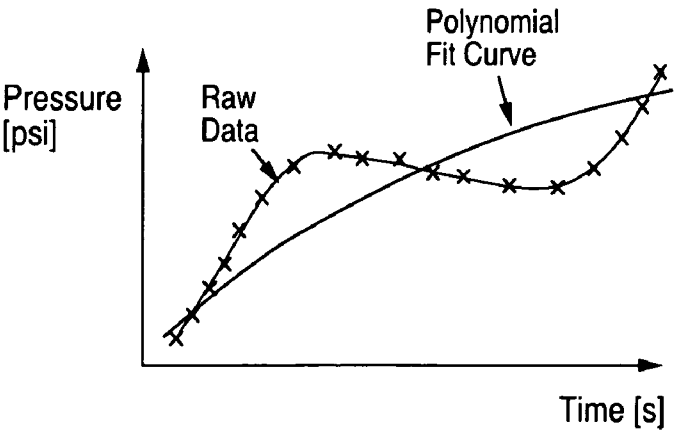

In particular embodiments, if the maximum positive or negative deviation occurs for a value at index m, the actuator performance monitor 106 may determine if that value is surrounded by three or more points (located at indices m−1, m+1, and m±2) of the same sign. If so, the actuator performance monitor 106 may ignore the maximum deviation at that index or delete this value from consideration. If this condition is met, the actuator performance monitor 106 can also ignore or delete the values at indices m±1, m±2, m±3, . . . , m±n that have the same sign as the value at index m, as long as each value is less than or equal to the value following or preceding it. This logic is illustrated in FIGS. 7 and 8, and it is used to avoid choosing maximum deviation values that are not related to the sticking and slipping phenomenon. More specifically, to determine if excessive sticking and slipping is occurring, the actuator performance monitor 106 should detect sudden changes in pressure, rather than gradual changes in pressure. As shown in FIG. 7, none of the values in FIG. 7 may be ignored or deleted because the point after the maximum deviation value is not of the same sign. The maximum deviation value occurs at a positive raw data value, while the subsequent raw data value is negative. In this case, excessive sticking and slipping may be occurring in the actuator. Compare this with the raw data values in FIG. 8, where all values except the endpoints could be ignored or deleted. In this example, there are no rapid changes in pressure, so the actuator likely is not sticking and then slipping (which should result in rapid pressure changes).

Another possible fault experienced by an actuator is a stuck actuator, or an actuator that is unable to change the amount of material exiting the actuator. This may also be referred to as seizure of the actuator. In a seized actuator, the volume of control air in the actuator does not change, resulting in a more rapid or steep rise or fall in the actuator's pressurization curve. This can be seen in FIG. 9, where a pressurization curve 902 is associated with a healthy actuator. A pressurization curve 904 is associated with an actuator stuck in an opened position, and a pressurization curve 906 is associated with an actuator stuck in a closed position. As seen here, the pressurization curves 904-906 have more rapid rise and fall times than the pressurization curve 902.

Various techniques could be used to identify a seized actuator. For example, in one technique, differences between the pressurization curves of healthy and seized actuators could be analyzed by scaling and translating the data to two common points.

In another technique, the time elapsed value of an unhealthy actuator's pressurization curve could be subtracted from the time elapsed value of a healthy actuator's pressurization curve at the same pressure, and a time difference plot can be generated. In this example, the data can be interpolated and extrapolated to a common healthy baseline pressurization curve if necessary. In this technique, when an actuator is installed, a baseline pressurization curve for the actuator can be generated. Whenever the actuator is tested, a new pressurization curve can be generated and compared to the baseline curve, and a time difference plot can be generated between the current pressurization curve and the baseline pressurization curve.

A time difference plot could be generated as follows. First, the time value for the current pressurization curve is determined at each of the baseline pressurization curve's pressure points. If no pressure point in the current pressurization curve exists at one of the baseline pressurization curve's pressure point, interpolation or extrapolation can be used to identify a pressure point in the current pressurization curve. An example interpolation is illustrated in FIG. 10, where lines 1002 represent the interpolation of time values in a current pressurization curve 1004 at pressure points in a baseline pressurization curve 1006.

This process can be performed for each baseline pressure point in the fill and exhaust stages, and two interpolated lists can be generated (one for the fill stage, and one for the exhaust stage). These two lists, along with lists of the fill and exhaust baseline pressure points, are then translated to zero. The translation could, for example, involve subtracting every value in a list by the first value in that list. This translation helps to ensure that the first time difference point is zero. Once this process is completed, a time difference plot can be generated by subtracting the interpolated times from the corresponding baseline times.

FIGS. 11 through 17 illustrate specific examples of this type of signal analysis. For example, FIG. 11 illustrates a time difference plot generated by comparing the pressurization curve of an actuator stuck in the closed position against the baseline pressurization curve of a healthy actuator. FIG. 12 illustrates a time difference plot generated by comparing the pressurization curve of an actuator stuck in the opened position against the baseline pressurization curve of a healthy actuator.

Figure 13:
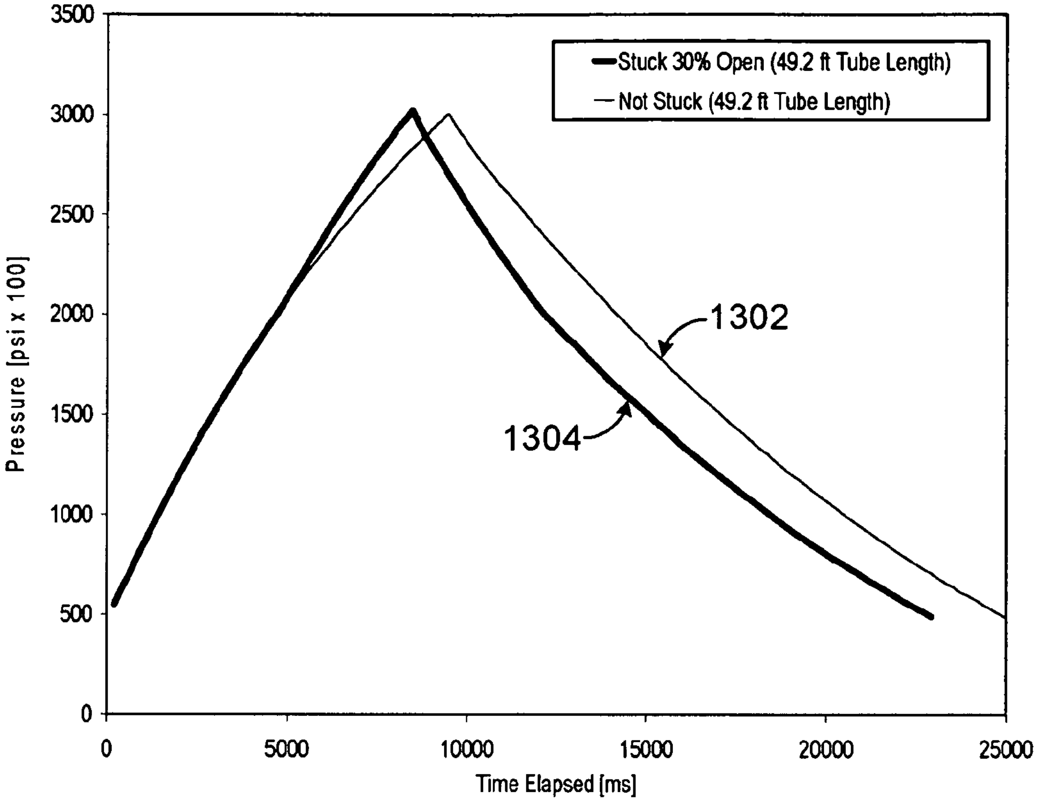
Figure 14:
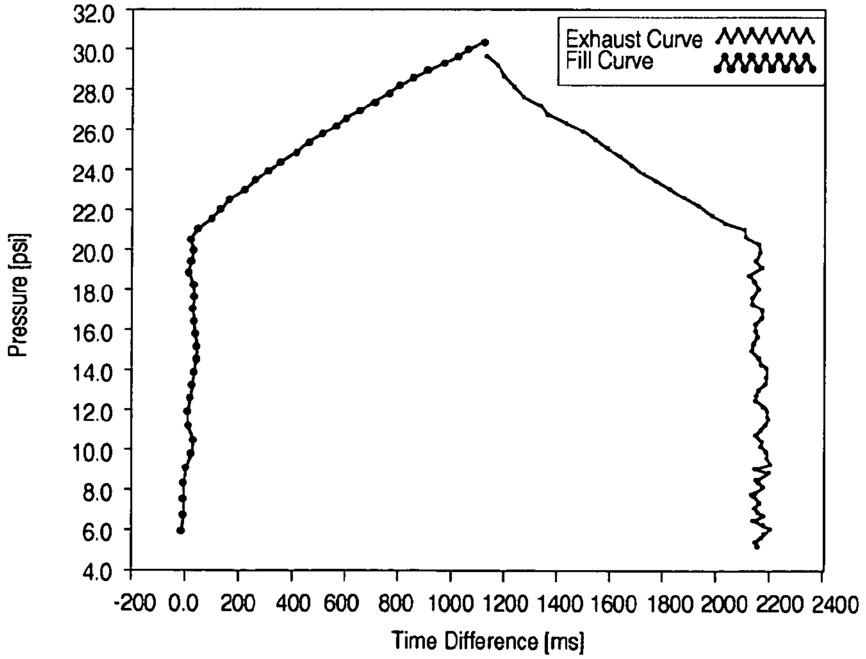

In FIG. 13, a pressurization curve 1302 is associated with a healthy actuator, while a pressurization curve 1304 is associated with an actuator stuck thirty percent open. FIG. 14 illustrates a time difference plot generated by comparing the pressurization curve of this stuck actuator against the baseline pressurization curve of a healthy actuator. As shown in FIG. 14, the actuator is functioning properly from 6 psi to 20 psi, but the time difference plot indicates a seized actuator from 20 psi to 30 psi.

Figure 15:
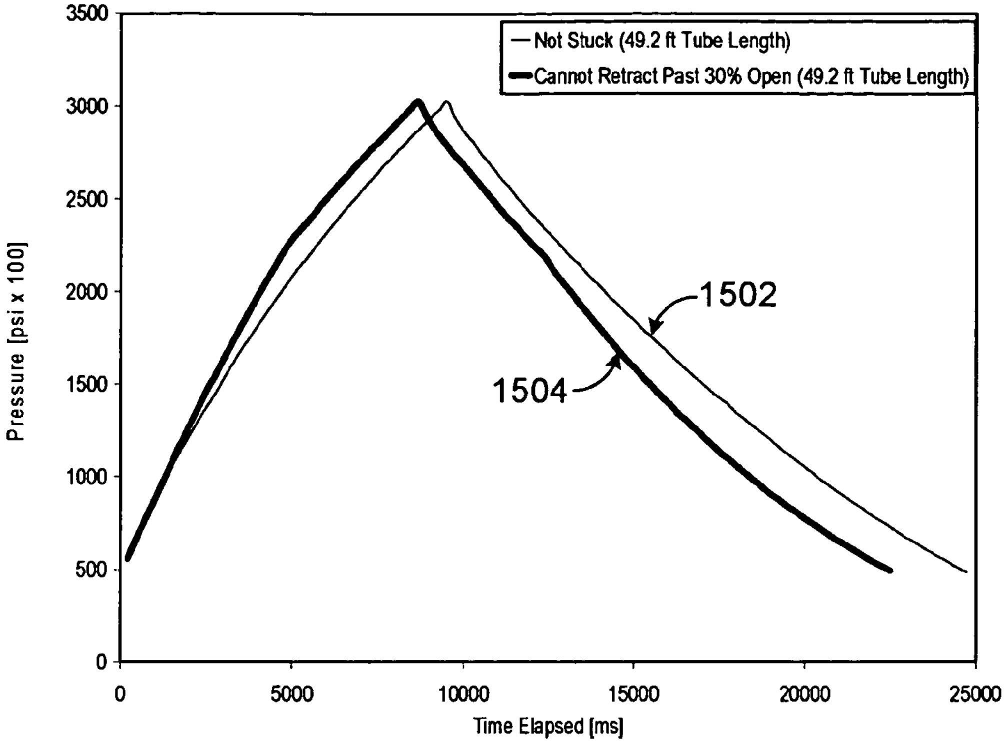
Figure 16:
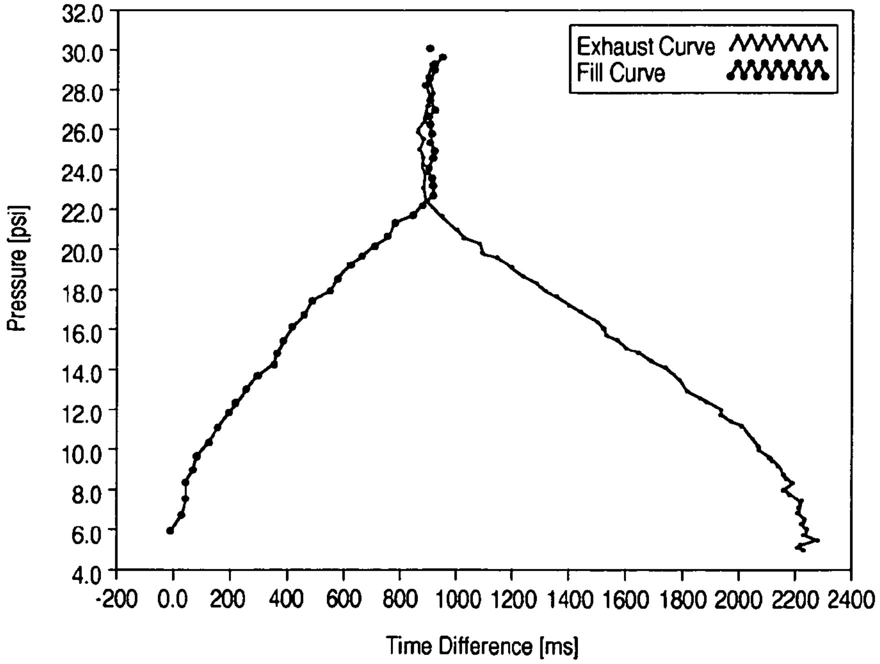

Similarly, in FIG. 15, a pressurization curve 1502 is associated with a healthy actuator, while a pressurization curve 1504 is associated with an actuator that is prevented from retracting past thirty percent open. This means the actuator can function properly when opened between thirty and one hundred percent. FIG. 16 illustrates a time difference plot generated by comparing the pressurization curve of this unhealthy actuator against the baseline pressurization curve of a healthy actuator. As shown in FIG. 16, the actuator is functioning properly from 22 psi to 30 psi, but the time difference plot indicates a seized actuator from 6 psi to 22 psi.

Figure 17:
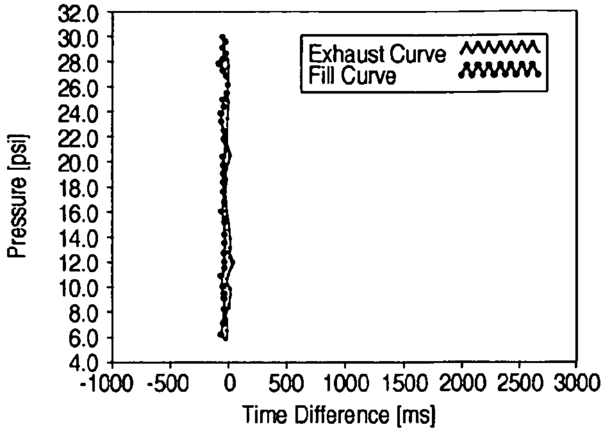
Figure 18:
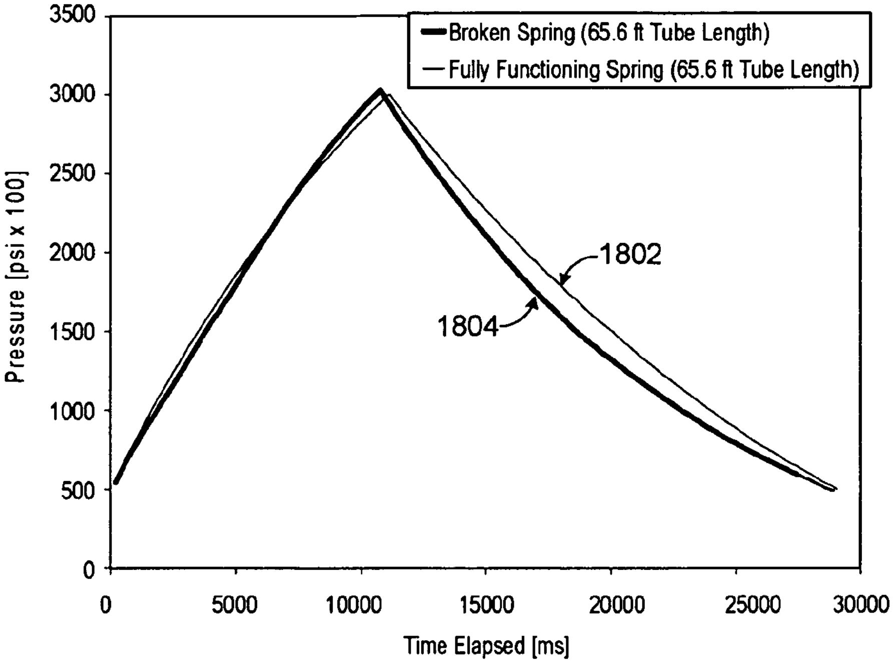

Ideally, the time difference plot for a healthy actuator may go straight up and then come straight down, such as is shown in FIG. 17. In order to differentiate between a seized actuator and a healthy actuator, the actuator performance monitor 106 could analyze the time difference plot for an actuator and determine if the time difference plot is similar to that shown in FIG. 17 or to any of those shown in FIGS. 11, 12, 14, and 16. For example, the actuator performance monitor 106 could determine the slope of a line connecting five consecutive points of a time elapsed versus pressure curve (similar to a pressurization curve but having the x-axis and y-axis switched). If the slope exceeds a threshold (such as 22 milliseconds/psi), those five points could indicate a seized actuator.

Figure 19:
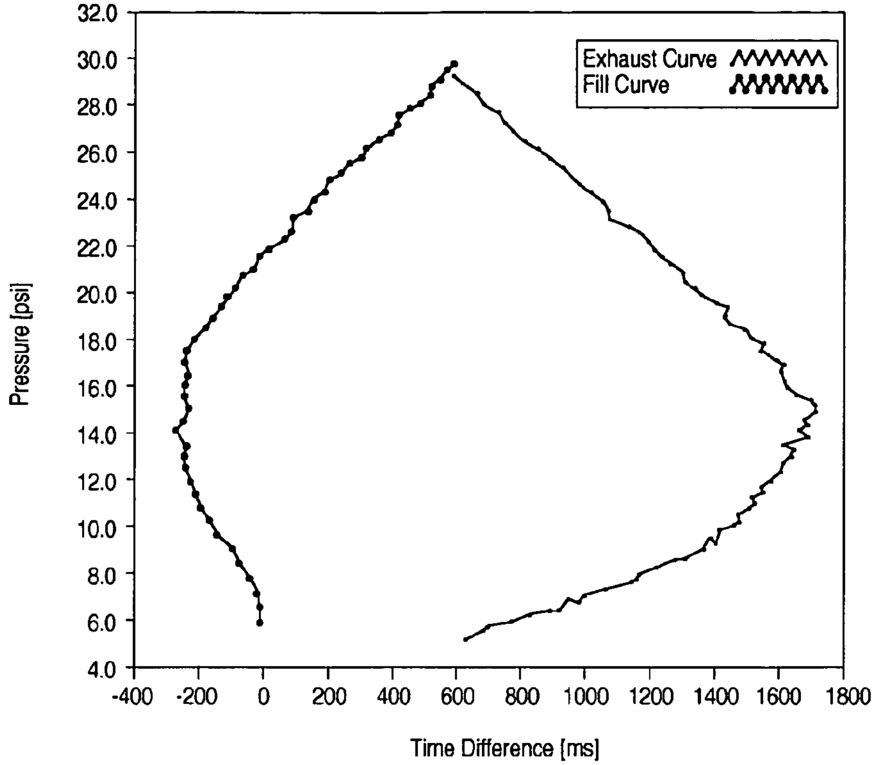

A third type of fault experienced by an actuator is a broken return spring, which ordinarily returns the actuator to a closed position. A spring failure may change the slope of the pressurization curve at the point where the spring can no longer affect the compression rate of the actuator. This can be seen in FIG. 18, where a pressurization curve 1802 is associated with a healthy actuator and a pressurization curve 1804 is associated with an actuator having a broken return spring. FIG. 19 illustrates a time difference plot generated by comparing the pressurization curve of an actuator with a broken spring against the baseline pressurization curve of a healthy actuator. This time difference plot has a shape that is distinct from the time difference plots associated with the seized actuators described above. In many cases, the time difference plot associated with an actuator having a broken spring exhibits a negative return effect in the exhaust curve, such as from a pressure of 15 psi to 5 psi.

In particular embodiments, the actuator performance monitor 106 could detect an actuator with a broken spring if the difference between (i) the largest time difference value in the exhaust curve (1720 milliseconds in this example) and (ii) the last value in the time difference exhaust curve (640 milliseconds in this example) is greater than a first threshold, such as 200 milliseconds. Also, this difference could be less than the first threshold but greater than a second threshold, such as 140 milliseconds. In this case, the actuator performance monitor 106 could examine the linearity of the fill curve in the time difference plot for pressures above a pressure threshold, such as 20 psi. As a particular example, the actuator performance monitor 106 could measure the mean squared error of the raw data above 20 psi in the fill stage of the test. If this error is above a threshold (such as 0.07), the actuator performance monitor 106 could identify a broken spring. In general, this helps to distinguish a broken spring time difference plot (which is often not linear and may have multiple inflection points) from a stuck actuator time difference plot (which is often linear for pressures between 20 psi and 30 psi).

Figure 20:
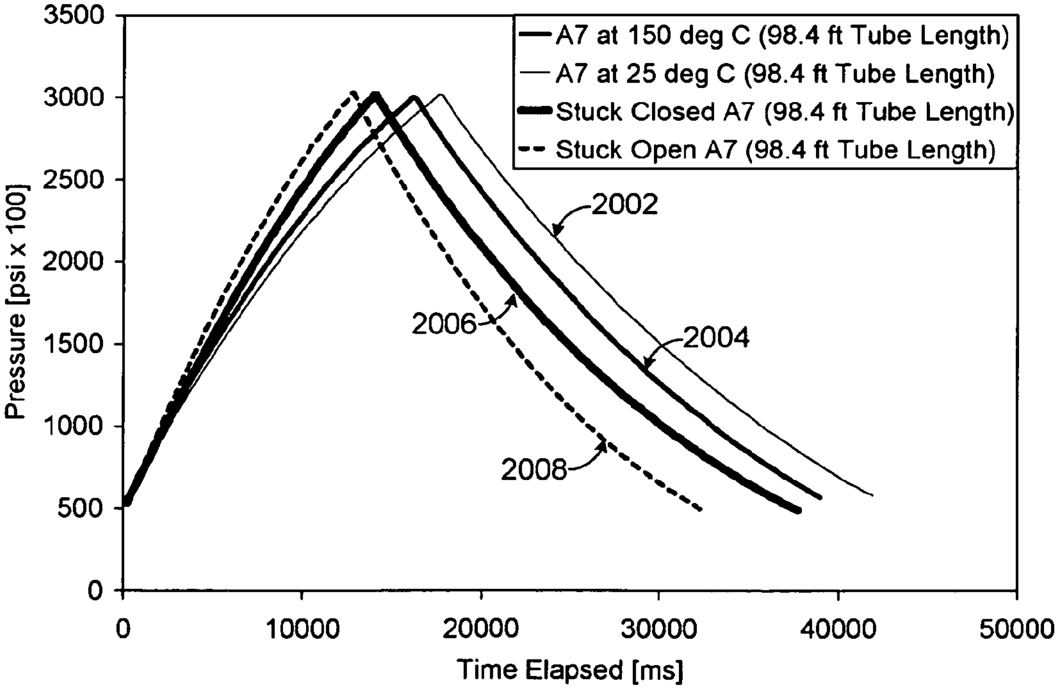

When performing the stuck actuator and broken spring analyses, the actuator performance monitor 106 may need to compensate for different temperatures experienced by an actuator. For example, in steam actuators 120, the actuators could be heated to temperatures above 150° C. when in operation. This could play a significant role in defining the actuator's pressurization curve (since temperature is related to pressure multiplied by volume). This means that for the same pulse length, a heated actuator may reach a higher pressure faster compared to an actuator at a lower temperature. This can be seen in FIG. 20, where a pressurization curve 2002 represents a cooler healthy actuator, a pressurization curve 2004 represents a warmer healthy actuator, a pressurization curve 2006 represents an actuator stuck in the closed position, and a pressurization curve 2008 represents an actuator stuck in the opened position. As shown in FIG. 20, the two healthy actuators' curves are very similar in shape, and all that may be needed is a scaling factor greater than one so that the warmer actuator's curve can be scaled to the cooler actuator's curve.

When the actuator's temperature is unknown or when the actuator is heating or cooling, the actuator performance monitor 106 may scale the actuator's current pressurization curve to the actuator's baseline curve. If this scaling factor is above a certain threshold, this could indicate that the actuator is stuck. The pressurization curve's shape for a stuck actuator is also different from the pressurization curve of an actuator at an elevated temperature (see FIG. 20).

In particular embodiments, in order to calculate the scaling factor, the actuator performance monitor 106 may use a repeating loop to multiply the current pressurization curve's interpolated time values (discussed above) by a number (starting from 1.00000) prior to subtracting the interpolated time values from the baseline time values to generate the time difference plot. On the next loop iteration, a value of 1.00001 may be used, and this process may continue until the loop has iterated a specified number of times (such as 80,000 times) or reached a specified scaling factor (such as a value of 1.8). Larger increments (such as 0.00002 or larger) can be used to reduce the total number of iterations executed.

Figure 21:
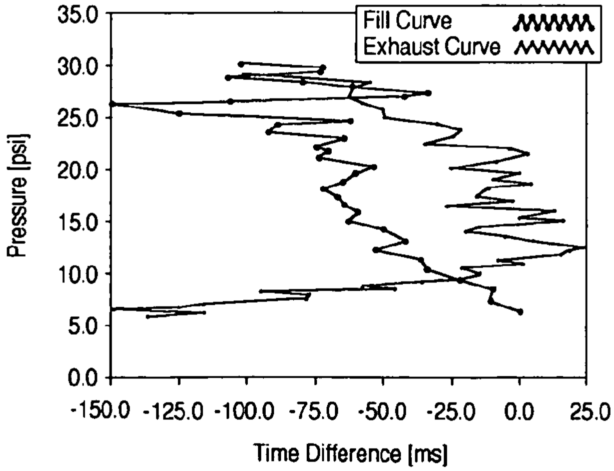

Once the data for each time difference plot is generated, the maximum time difference value of each plot may be subtracted from the minimum time difference value of that plot and stored as the time difference width for that plot. For example, as shown in FIG. 21, the time difference width would have a value of 25−(−150), or 175. Multiple time difference widths could be determined (such as one for each of the 80,000 time difference plots), and each one could be associated with a different scaling factor (such as a value from 1.00000 to 1.80000). The scaling factor selected by the actuator performance monitor 106 could have the smallest time difference width. Depending on the implementation, the time difference widths could ordinarily range from 40 milliseconds to 200 milliseconds, and a time difference width above 400 milliseconds could indicate a problem with the actuator.

Figure 22:
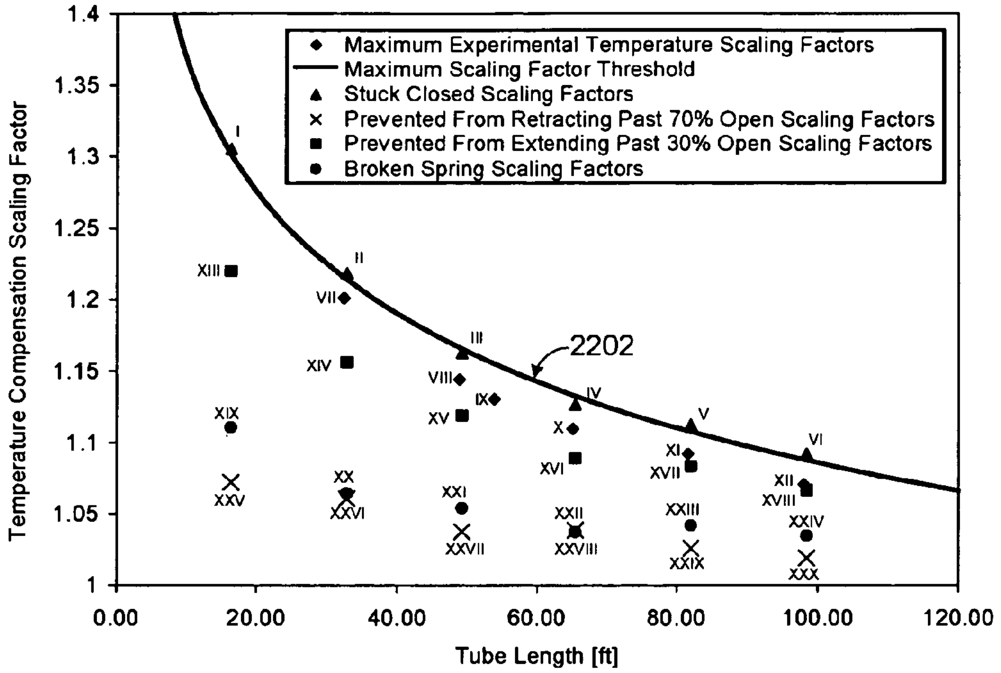
Figure 23:
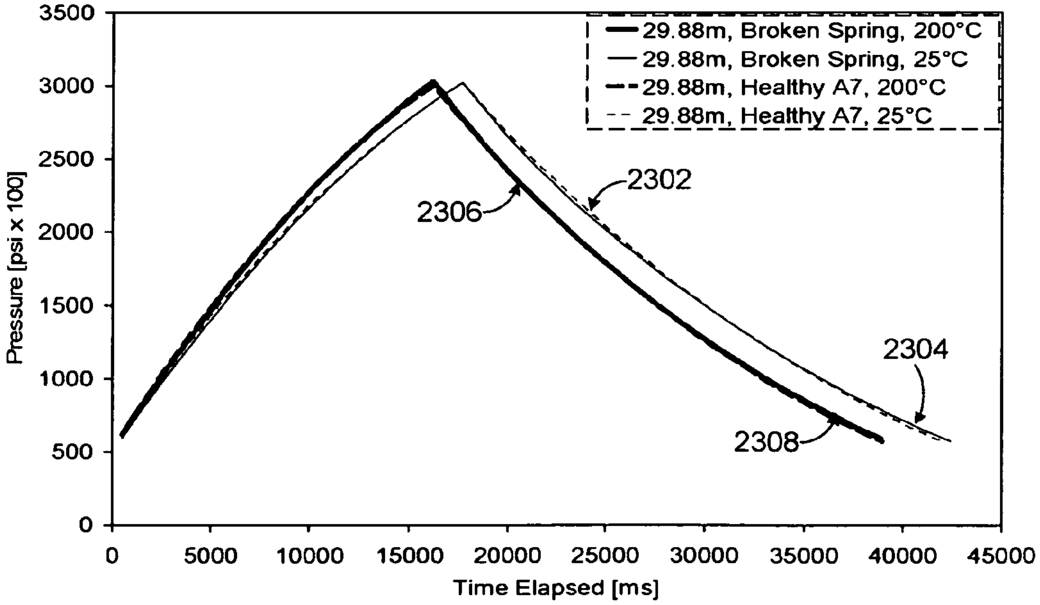
Figure 25:
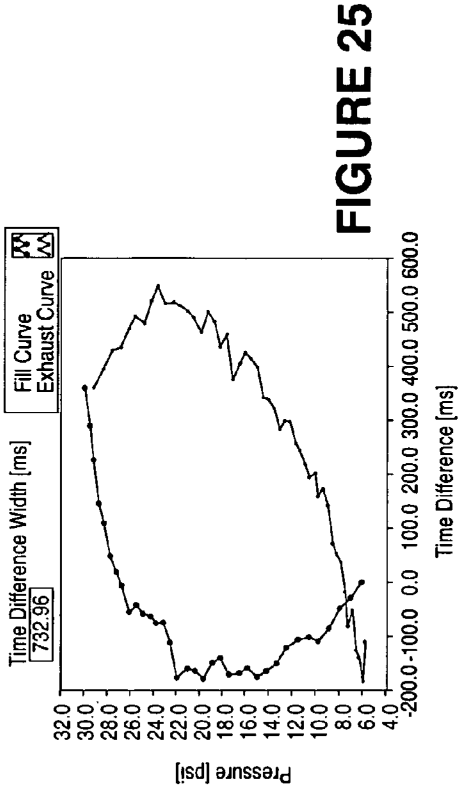
Figure 24:
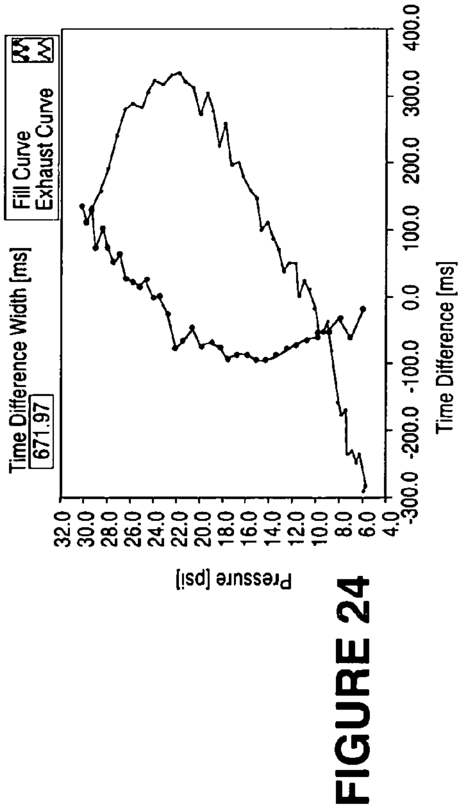
Figure 26:
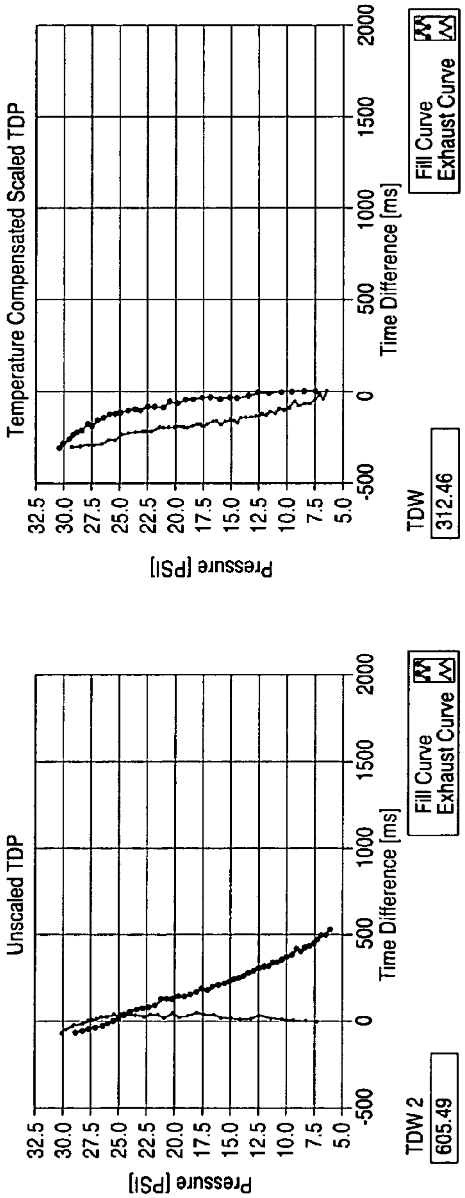
Figure 27:
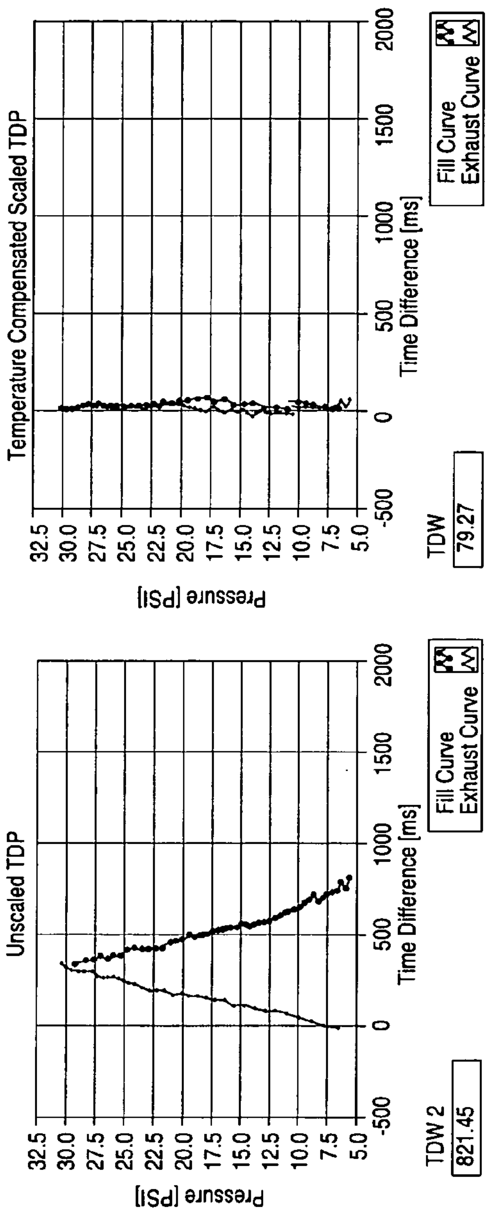
Figure 28:
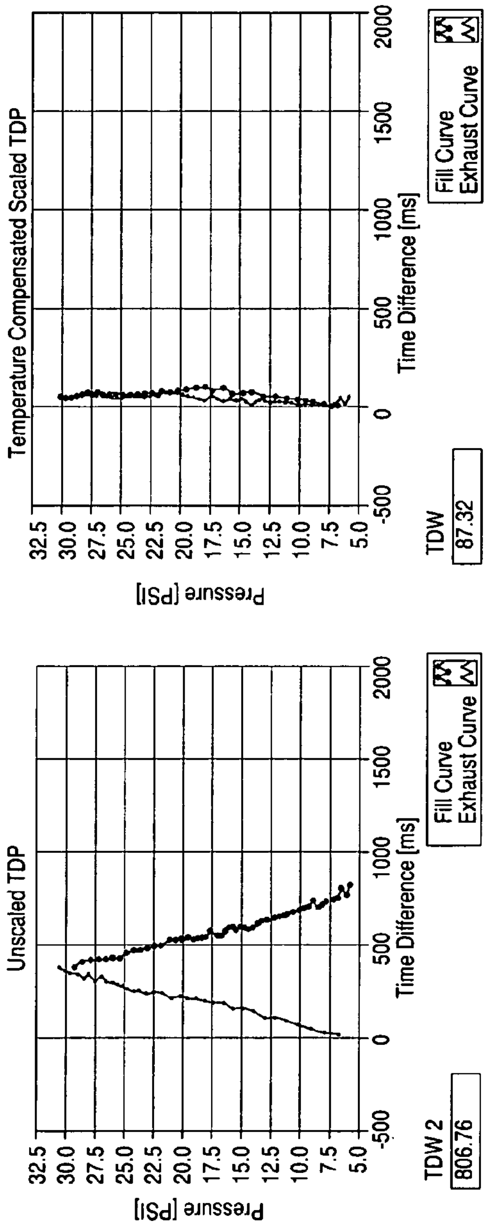
Figure 29:
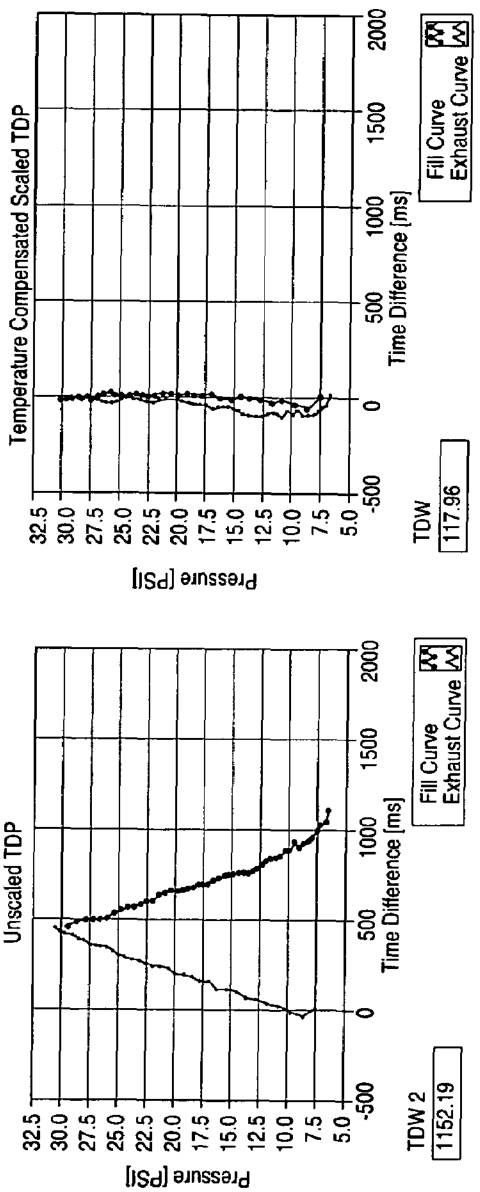
Figure 30:
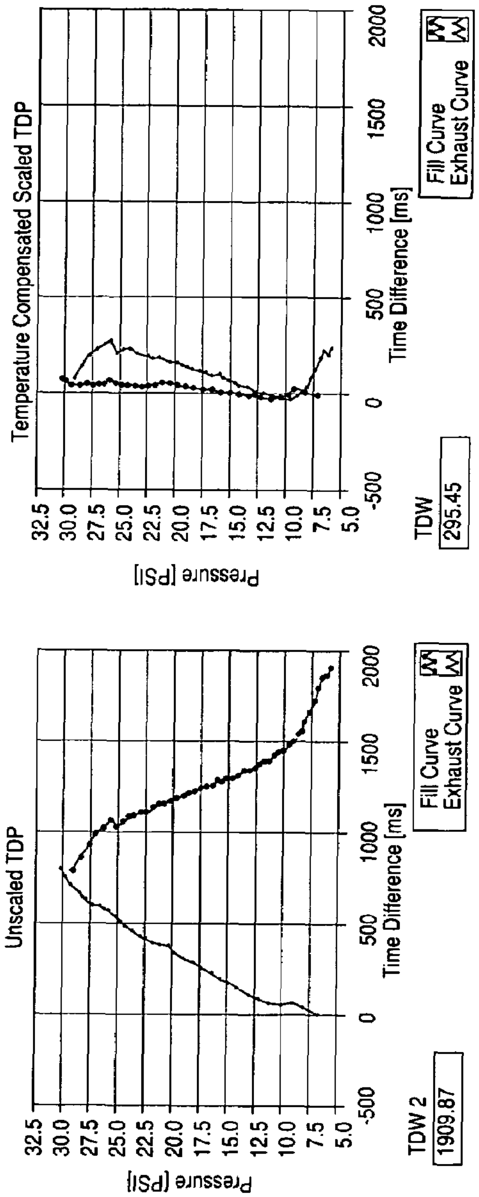

After testing a certain type of actuator with different tube lengths at elevated temperatures (such as six tube lengths above 170° C.), the highest scaling factors can be plotted as shown in FIG. 22. A "maximum scaling factor threshold" line 2202 is also shown in FIG. 22. Any scaling factors above this line 2202 could be unacceptable, and the scaling factor that would be used is the maximum scaling factor threshold along the line 2202. As shown in FIG. 22, four possible scenarios (stuck closed, broken spring, prevented from retracting, and prevented from extending) may be difficult to detect because their time difference widths could be the smallest. When these four cases are put into an elevated temperature environment, the pressurization curve time values may be even smaller, and it may be easier to detect a faulty actuator (the time difference width becomes larger). This is validated as shown in FIGS. 23 through 25. For example, as shown in FIG. 23, the pressurization curves 2302-2304 are associated with a healthy actuator and an actuator with a broken spring at a lower temperature, and the pressurization curves 2306-2308 are associated with a healthy actuator and an actuator with a broken spring at a higher temperature. However, FIGS. 24 and 25 respectively illustrate temperature compensation scaled time difference plots for the cooler and warmer actuators with broken springs. In this example, comparing FIGS. 24 and 25, the time difference width for a broken spring actuator at 200° C. (733 milliseconds) is larger than the time difference width for a broken spring actuator at 25° C. (672 milliseconds). Temperature compensation therefore helps to increase the chances that the actuator performance monitor 106 can detect a faulty actuator.

A fourth type of fault that can affect actuators involves moisture in a control signal line for an actuator, such as water in a pneumatic control signal line. Water or other moisture in a pneumatic air line often decreases the volume of the air that is compressed in the line. Effectively, removing the water from a shorter tube may yield the same pressurization curve as having the water in a longer tube (since the volumes are equal). As a result, it may be difficult to identify differences in pressurization curve shapes because the shapes of the temperature compensated pressurization curves can be almost identical for different tube lengths. Moisture and temperature may have the same or similar effect on the pressurization curves. For example, if a time difference plot has a maximum value of 2,000 milliseconds and a time difference width of 100 milliseconds once scaled, it may be difficult to tell if the actuator is at 200° C. with 0 milliliters of water, 100° C. with 10 milliliters of water, or 25° C. with 20 milliliters of water.

FIGS. 26 through 30 illustrate un-scaled and temperature compensation scaled time difference plots for varying amounts of water in an air line. More specifically, FIGS. 26 through 30 illustrate time difference plots associated with amounts of water ranging from 5 milliliters (FIG. 26) to 25 milliliters (FIG. 30), with a 5-milliliter increment per figure. These plots may not change much with tube length. A phenomenon common for many tube lengths is that, with each 5-milliliter increment of water, a distinguishable trend can be seen, namely a wider and wider inverted "v" shape. Over time, this trend can be used to identify when more and more moisture is accumulating in a pneumatic control line.

Figure 31:
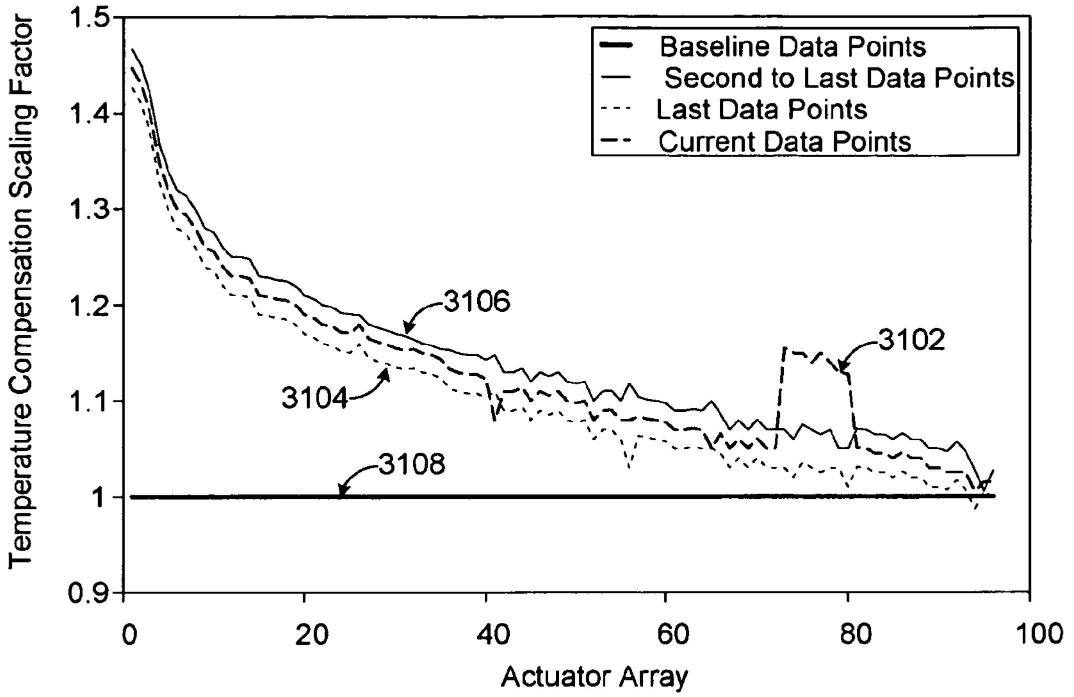

In addition, as shown in FIG. 31, using another graph that plots the scaling factors for the whole actuator array may be useful to identify actuators with moisture in their control lines. Since every actuator in an array may be roughly at the same temperature, the actuators may all have roughly the same scaling factor trend. If there is a scaling factor trend that is anomalous, that actuator may be suspect. This technique could be used to detect actuators with moisture in their control air lines because these actuators may have higher scaling factors than their surrounding neighbors. For example, as shown in FIG. 31, the current time difference widths 3102 are plotted along with the last (most recent) time difference widths 3104, the second to last time difference widths 3106, and the baseline time difference widths 3108. As the actuator array number increases, the tube length to the actuators also increases because the actuators are further and further away from their controllers. As the tube length decreases, the temperature compensation scaling factor increases exponentially as shown in FIG. 31. If there is moisture entering the supply line of one controller, eight consecutive actuators could be affected, increasing the scaling factor of eight consecutive points as shown in the time difference widths 3102 of FIG. 31.

Figure 32:
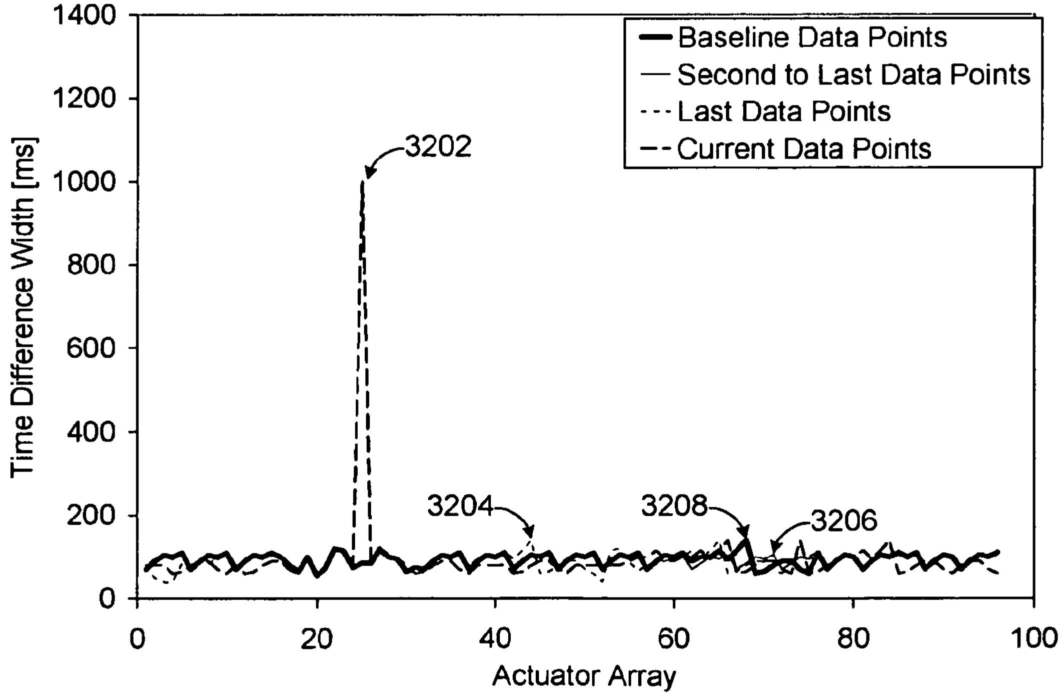
Figure 33:
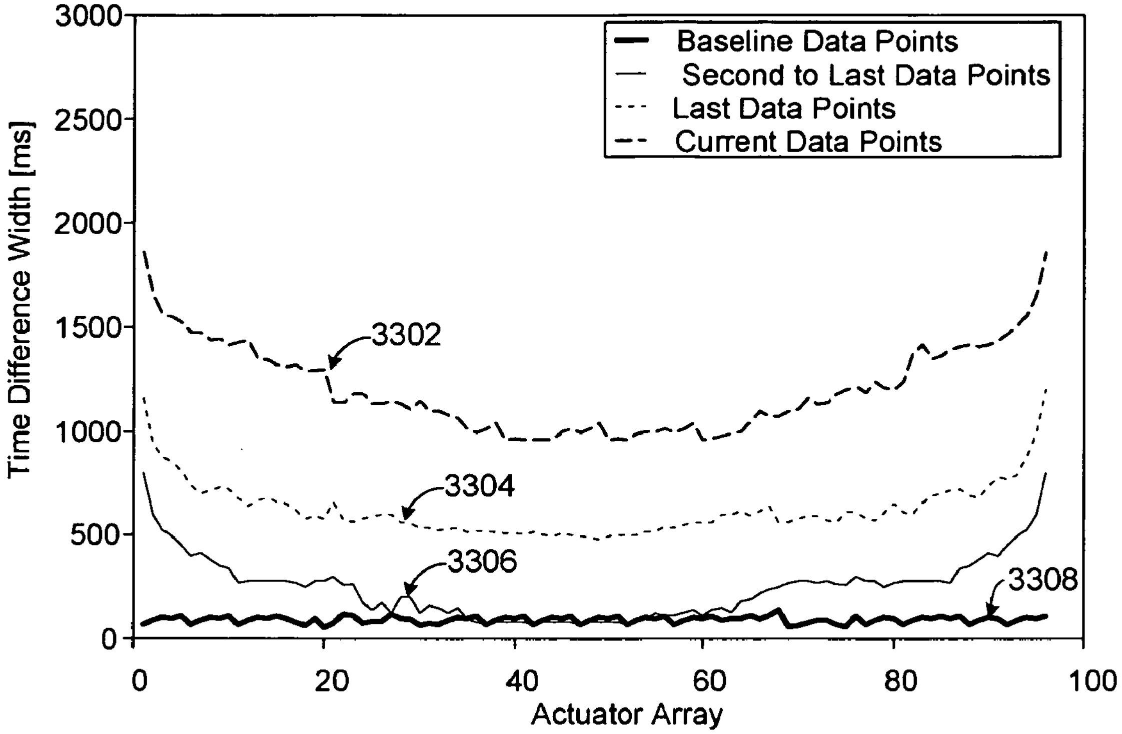

A fifth possible fault in an actuator involves a plugged screen plate. The actuator performance monitor 106 could detect a plugged screen plate when it identifies multiple consecutive faulty actuators, such as when three adjacent actuators have time difference widths exceeding 400 milliseconds. This may indicate that something is faulty with a section of an actuator beam or with the specific controller 104 controlling these actuators. One way of identifying problems with a specific section of a beam or a controller is by plotting the time difference widths of all actuators on the beam. As shown in FIGS. 32 and 33, the current time difference widths can be plotted on the same graph with one, some, or all prior time difference widths. For example, as shown in FIG. 32, the current time difference widths 3202 are plotted along with the last time difference widths 3204, the second to last time difference widths 3206, and the baseline time difference widths 3208. Similarly, as shown in FIG. 33, the current time difference widths 3302 are plotted along with the last time difference widths 3304, the second to last time difference widths 3306, and the baseline time difference widths 3308. This allows the actuator performance monitor 106 to determine if there is a suddenly plugged screen plate (FIG. 32) or a slowly plugged screen plate (FIG. 33).

It is also possible to plot all of the data points of every actuator test or to generate a three-dimensional graph (surface) that shows both changes in time and changes across the beam itself. This technique could be used in detecting accumulating debris that causes the screen plate to be plugged. As the screen gets more and more plugged, the time difference width may increase across the whole array (as shown in FIG. 33), making it possible to detect the plugged screen plate.

A sixth possible fault with an actuator involves actuator hysteresis. Actuator hysteresis represents the maximum change in pressure that does not result in movement of the actuator, so higher hysteresis typically indicates higher static friction. Hysteresis can deteriorate or ameliorate with time, and hysteresis can change depending on the pressure inside the actuator. Also, the level of hysteresis could be worse when filling and then exhausting, compared to exhausting after exhausting.

Actuator hysteresis may be identified by operating an actuator in small steps or bumps, meaning small pressure setpoint changes are caused in the actuator. By changing the pressure differential over a series of steps, the actuator performance monitor 106 can identify a pressure deviation or spike when the actuator finally responds to the setpoint change (by changing its operating position). In this way, the actuator performance monitor 106 can identify the degree of hysteresis present in the actuator.

Figure 35:
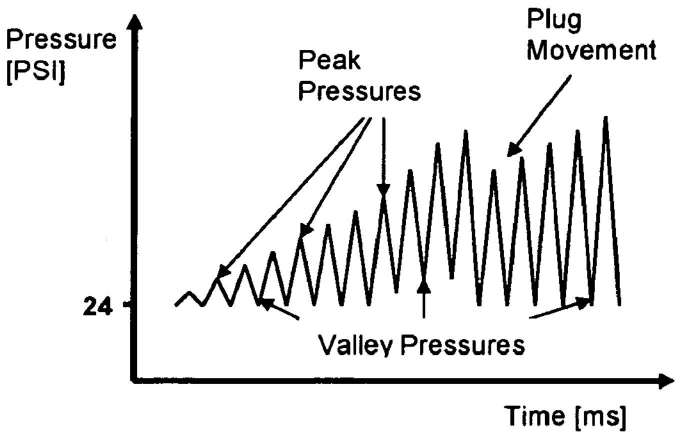
Figure 34:
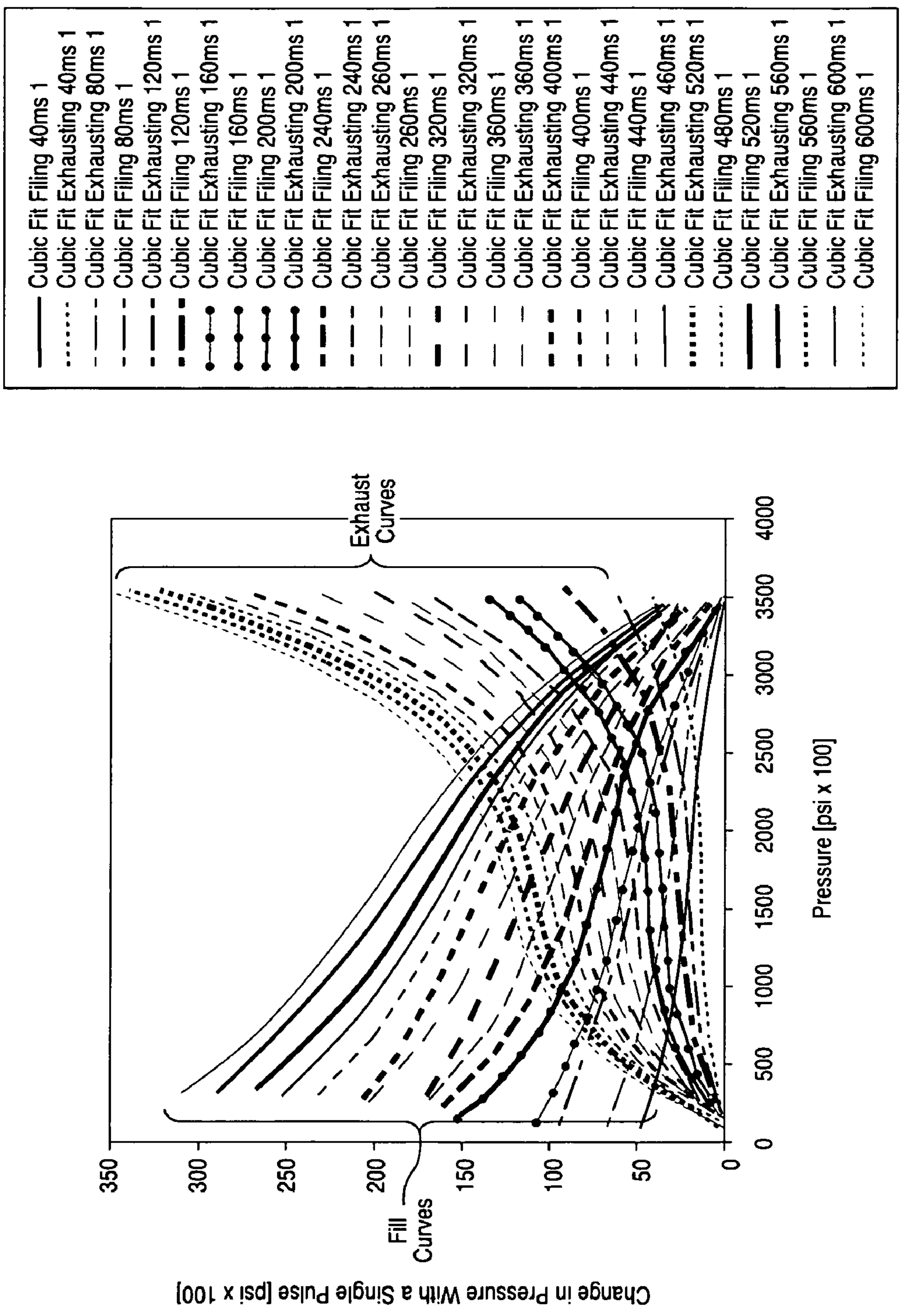

In particular embodiments, around a particular pressure (such as 24 psi), a change in pressure of a single pulse may be relatively the same regardless of whether the actuator is filling or exhausting. This can be shown in FIG. 34, where the intersection between the fill curves and the exhaust curves are approximately at 24 psi, regardless of pulse length or tube length. The actuator performance monitor 106 may make small increments in the pulse length and plot these pressure changes with time. For example, starting at a pressure of 24 psi, an actuator can be filled for 4 milliseconds and then exhausted for 4 milliseconds. The actuator may then be filled for 8 milliseconds and exhausted for 8 milliseconds. This cycle may continue for 12 milliseconds, 16 milliseconds, and so on. A plot of pressure versus time can be generated as shown in FIG. 35. Initially, the pulse lengths may not be long enough to make the actuator move. Eventually, with long enough pulse lengths, the actuator suddenly starts to move. This jump can be seen in a plot displaying the peak pressures subtracted from the valley pressures as shown in FIG. 36.

Figure 36:
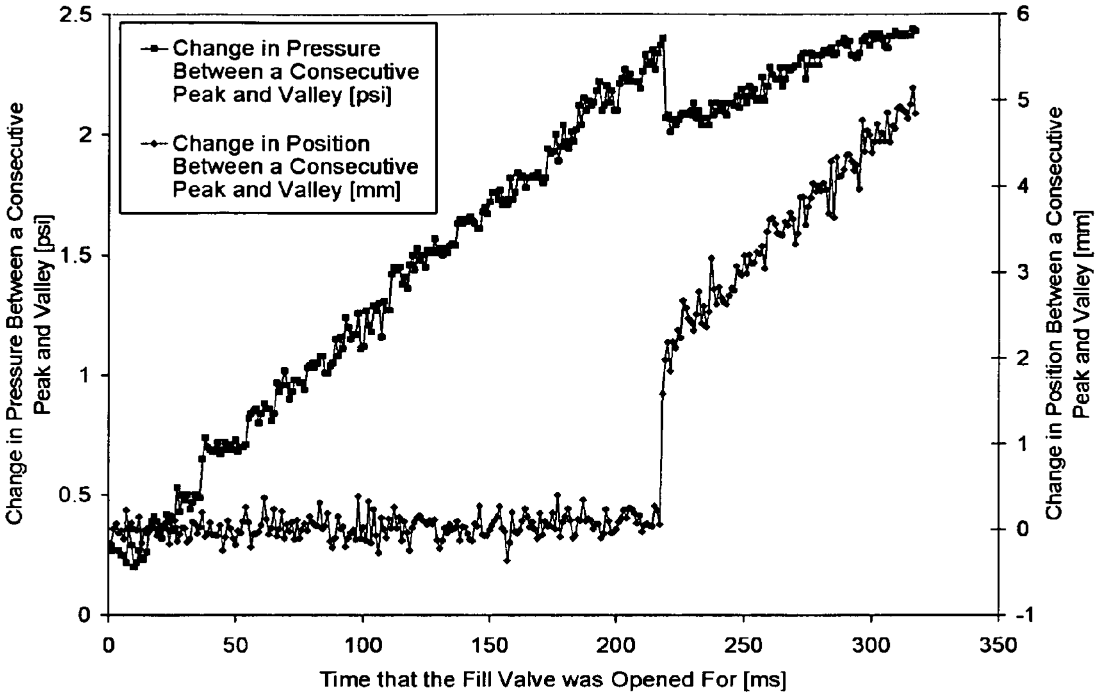
Figure 37:
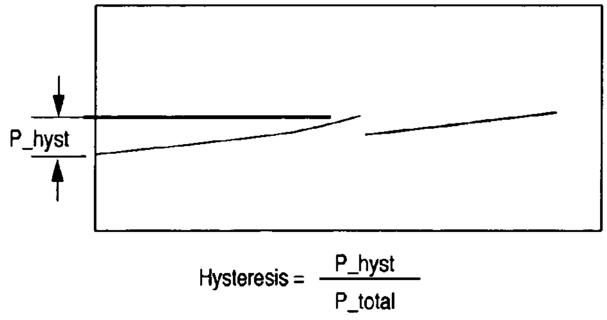

In order to determine the amount of hysteresis in an actuator, the actuator performance monitor 106 can identify the largest decrease in pressure between consecutive points in the plot of FIG. 36. The pressure may drop a significant amount because, as soon as the actuator starts to move, the volume of the actuator becomes greater and decreases the pressure. As shown in FIG. 36, the actuator starting to move creates a change in pressure. To determine the level of hysteresis as a percentage, this pressure can be divided by the total range of pressure of the actuator (or the inlet pressure of the controller 104) as shown in FIG. 37. The total range of pressure of the actuator could be 35 psi. On average, certain actuators could have hysteresis values ranging from 0.5% to 10%, and any value that exceeds these values or any other threshold could indicate a faulty actuator.

Any other or additional faults could be detected by the actuator performance monitor 106. For example, the actuator performance monitor 106 could determine whether a leak exists in a pneumatic control signal for an actuator. An air leak could result in a drooping pressurization curve. Also, a blocked air line could result in a very long pressurization curve having a small slope compared to, for example, the pressurization curve 502 for a healthy actuator shown in FIG. 5. Further, if an actuator is partially or completely "deadheaded" (a material such as steam has no exit after a valve), a higher backpressure that resists valve travel in the actuator exists. This may result in a slower response time for the actuator.

In addition, the actuator performance monitor 106 could be used to detect significant mechanical changes in the process control system 100. For example, the actuator performance monitor 106 could detect when the time needed to reach a particular pressure at an actuator has increased significantly. In the absence of any faults, this could indicate that the process control system 100 has recently been modified to include a pneumatic control tube with a larger diameter, larger volume, or longer length.

Using the techniques described above with respect to FIGS. 5 through 37, the actuator performance monitor 106 can analyze information collected during an actuator performance test. This allows the actuator performance monitor 106 to identify possible faults with one or more actuators, even when the faults may not be readily apparent to a user viewing a pressurization curve.

Although FIGS. 5 through 37 illustrate examples of signal analyses for identifying actuator faults, various changes may be made to FIGS. 5 through 37. For example, other or additional types of signals could be analyzed. Also, other or additional types of signal analyses could be performed to identify faults in an actuator.

Figure 38:
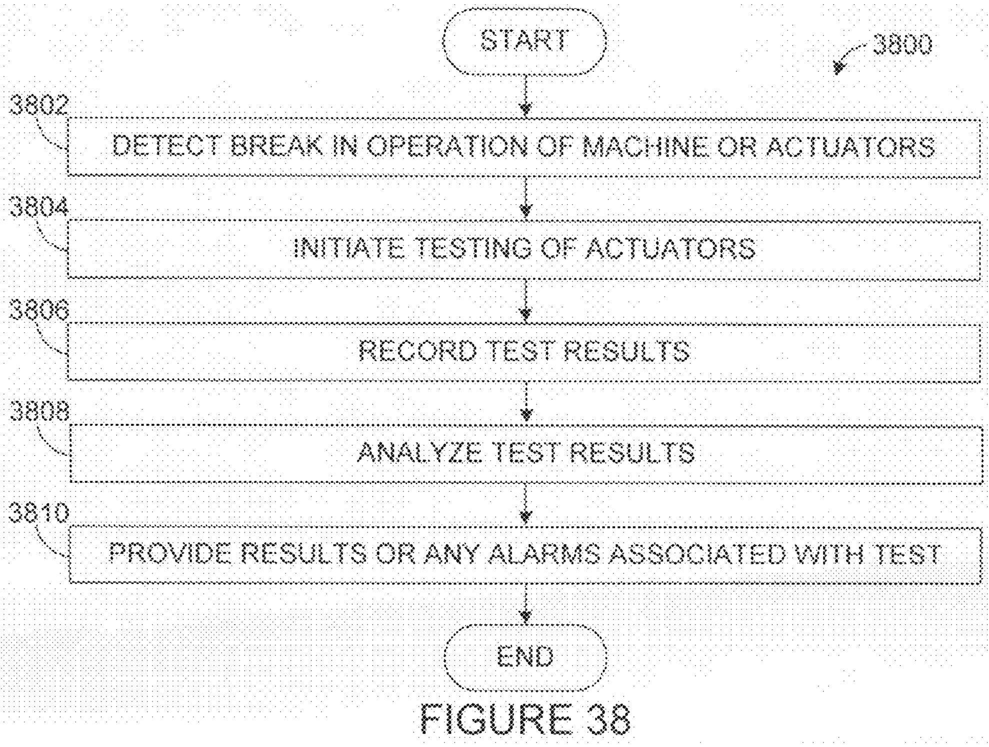
FIG. 38 illustrates an example method for actuator performance monitoring in a process control system in accordance with this disclosure.

FIG. 38 illustrates an example method 3800 for actuator performance monitoring in a process control system in accordance with this disclosure. For ease of explanation, the method 3800 is described as being used by the actuator performance monitor 106 in the process control system 100 of FIG. 1. The method 3800 could be used by any other suitable device and in any other suitable system.

The actuator performance monitor 106 detects a break in the operation of a machine or actuators in the machine at step 3802. This may include, for example, the actuator performance monitor 106 detecting that a paper sheet 110 being produced by a paper machine 102 has broken or that operation of the paper machine 102 has been disabled or otherwise stopped. This may also include the actuator performance monitor 106 detecting that particular actuators are no longer in use, such as by detecting that use of steam in the paper machine 102 has been disabled or that the steam has been shut off.

The actuator performance monitor 106 initiates testing of one or more actuators at step 3804, and the actuator performance monitor 106 records the test results at step 3806. This may include, for example, the actuator performance monitor 106 causing the controller 104 to begin increasing and decreasing the pressure supplied to one or more actuators (filling and exhausting the actuators) in the paper machine 102. As a particular example, this may include the actuator performance monitor 106 causing the controller 104 to begin increasing the pressure of a pneumatic control signal to an actuator in small steps from 6 psi to 30 psi. This may also include the actuator performance monitor 106 identifying how the actuator responds to the increasing and decreasing pressure.

The actuator performance monitor 106 analyzes the test results and identifies any faults with the actuator(s) at step 3808. This may include, for example, the actuator performance monitor 106 generating a pressurization curve for each tested actuator. This may also include the actuator performance monitor 106 comparing the current pressurization curve to one or more prior curves, such as a baseline pressurization curve, for each actuator. Further, this may include the actuator performance monitor 106 modifying the current pressurization curve to compensate for the temperature of the actuator. In addition, this may include the actuator performance monitor 106 generating one or more time difference plots and using the plots to identify possible faults with the actuator.

The actuator performance monitor 106 provides the test results or any alarms associated with the test at step 3810. This may include, for example, the actuator performance monitor 106 generating a graphical display for a user (such as the graphical user interface 200 of FIG. 3) containing one or more of the plots. The graphical display could also indicate which tests an actuator passed and failed.

Although FIG. 38 illustrates one example of a method 3800 for actuator performance monitoring in a process control system, various changes may be made to FIG. 38. For example, while shown as a series of steps, various steps in FIG. 38 could overlap or occur in parallel.

In some embodiments, various functions described in this disclosure are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used in this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, or software, or a combination of at least two of the same. It should be noted that the functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:

initiating a test of an actuator in a process control system, wherein the test includes providing a varying control signal to the actuator, the varying control signal including a varying pressure signal;

analyzing a response of the actuator to the varying control signal to determine if the actuator is suffering from one or more faults; and providing at least one notification identifying any identified faults;

wherein analyzing the response of the actuator comprises:

generating a pressurization curve for the actuator, the pressurization curve identifying how a pressure in the actuator varies over time in response to the varying pressure signal;

selecting two polynomial curves that best fit the pressurization curve;

identifying a maximum positive deviation and a maximum negative deviation of the pressurization curve from each of the polynomial curves;

summing the maximum positive and negative deviations for the polynomial curves; and determining if the sum exceeds a threshold; and wherein the actuator comprises an actuator in a paper sheet production machine operable to manufacture a paper sheet.

2. The method of claim 1, wherein:

the actuator represents one of a plurality of actuators, each actuator associated with one of a plurality of first pressurization curves;

the test represents one of a plurality of tests, each test associated with a different set of scaling factors for the first pressurization curves; and analyzing the response of the actuator further includes identifying an anomaly in a trend of the scaling factors.

3. The method of claim 1, further comprising detecting a break in operation of the actuator or the machine;

wherein initiating the test of the actuator includes initiating the test of the actuator in response to the detected break.

4. The method of claim 1, wherein analyzing the response of the actuator includes comparing the response of the actuator to a previous response of the actuator.

5. The method of claim 3, wherein:

the actuator represents one of a plurality of steam actuators in the paper production machine.

6. A method, comprising:

initiating a test of an actuator in a process control system, wherein the test includes providing a varying control signal to the actuator, the varying control signal including a varying pressure signal;

analyzing a response of the actuator to the varying control signal to determine if the actuator is suffering from one or more faults; and providing at least one notification identifying any identified faults;

wherein analyzing the response of the actuator comprises:

generating a first pressurization curve for the actuator, the first pressurization curve identifying how a pressure in the actuator varies over time in response to the varying pressure signal;

comparing the first pressurization curve to a second pressurization curve;

generating a time difference plot based on the comparison, the time difference plot identifying how the first pressurization curve differs from the second pressurization curve over time; and analyzing the time difference plot to determine if the actuator is suffering from any faults; and wherein the actuator comprises an actuator in a sheet production machine operable to manufacture a sheet.

7. The method of claim 6, wherein the second pressurization curve includes a baseline pressurization curve generated when the actuator was first commissioned in the process control system.

8. The method of claim 6, wherein analyzing the time difference plot includes at least one of:

determining whether the time difference plot indicates that the actuator is stuck opened, closed, or partially opened; and determining whether the time difference plot indicates that the actuator cannot expand or retract completely.

9. The method of claim 6, wherein analyzing the tune difference plot includes:

determining whether the time difference plot indicates that the actuator has a broken return spring.

10. The method of claim 6, further comprising:

determining a scaling factor for adjusting at least one of the pressurization curves, the scaling factor compensating for a difference in temperature of the actuator.

11. The method of claim 6, wherein:

generating the time difference plot includes generating a plurality of time difference plots associated with a plurality of tests of the actuator; and analyzing the time difference plot includes analyzing the plurality of time difference plots to determine if moisture is accumulating in a control line of the actuator.

12. The method of claim 6, wherein:

the actuator represents one of a plurality of actuators;

the test represents one of a plurality of tests;

generating the time difference plot includes generating for each test a plurality of time difference plots associated with the actuators; and analyzing the time difference plot includes determining a width of each of the plurality of time difference plots and analyzing how the widths of the time difference plots vary over time.

13. A method, comprising:

initiating a test of an actuator in a process control system, wherein the test includes providing a varying control signal to the actuator;

analyzing a response of the actuator to the varying control signal to determine if the actuator is suffering from one or more faults; and providing at least one notification identifying any identified faults;

wherein analyzing the response of the actuator comprises:

determining a maximum pressure drop in the actuator between two consecutive pulses in a pressure control signal provided to the actuator; and determining if a ratio of the maximum pressure drop and a total range of pressure of the actuator exceeds a threshold; and wherein the actuator comprises an actuator in a sheet production machine operable to manufacture a sheet.

14. An apparatus comprising at least one processor, the at least one processor operable to:

initiate a test of an actuator in a process control system, wherein the test includes providing a varying control signal to the actuator, the varying control signal including a varying pressure signal, and wherein the actuator comprises an actuator in a paper sheet production machine operable to manufacture a paper sheet;

analyze a response of the actuator to the varying control signal to determine if the actuator is suffering from one or more faults; and provide at least one notification identifying any identified faults;

wherein the at least one processor is operable to analyze the response of the actuator by:

generating a pressurization curve for the actuator, the pressurization curve identifying how a pressure in the actuator varies over time in response to the varying pressure signal;

selecting two polynomial curves that best fit the pressurization curve;

identifying a maximum positive deviation and a maximum negative deviation of the pressurization curve from each of the polynomial curves;

summing the maximum positive and negative deviations for the polynomial curves; and determining if the sum exceeds a threshold.

15. The apparatus of claim 14, wherein:

the actuator represents one of a plurality of actuators, each actuator associated with one of a plurality of pressurization curves;

the test represents one of a plurality of tests, each test associated with a different set of scaling factors for the pressurization curves; and the at least one processor is operable to analyze the response of the actuator by identifying an anomaly in a trend of the scaling factors.

16. The apparatus of claim 14, wherein:

the at least one processor is further operable to detect a break in operation of the actuator or the machine; and the at least one processor is operable to initiate the test of the actuator in response to the detected break.

17. The apparatus of claim 14, wherein:

the test of the actuator includes testing for a plurality of different faults; and the at least one processor is operable to provide at least one notification identifying any identified faults by generating a graphical display, the graphical display identifying a pass/fail status associated with each of the different faults.

18. An apparatus comprising:

at least one processor operable to:

initiate a test of an actuator in a process control system, wherein the test includes providing a varying control signal to the actuator, the varying control signal including a varying pressure signal, wherein the actuator comprises an actuator in a sheet; production machine operable to manufacture a paper sheet;

analyze a response of the actuator to the varying control signal to determine if the actuator is suffering from one or more faults; and provide at least one notification identifying any identified faults;

wherein the at least one processor is operable to analyze the response of the actuator by:

generating a first pressurization curve for the actuator, the first pressurization curve identifying how a pressure in the actuator varies over time in response to the varying pressure signal;

generating a time difference plot identifying how the first pressurization curve differs from a second pressurization curve over time; and analyzing the time difference plot to determine if the actuator is suffering from any faults; and at least one memory operable to store the second pressurization curve.

19. The apparatus of claim 18, wherein the at least one processor is further operable to determine a scaling factor for adjusting at least one of the pressurization curves, the scaling factor compensating for a difference in temperature of the actuator.

20. The apparatus of claim 18, wherein:

the actuator represents one of a plurality of actuators;

the test represents one of a plurality of tests;

the at least one processor is operable to generate for each test a plurality of time difference plots associated with the actuators; and the at least one processor is operable to analyze the time difference plot by determining a width of each of the plurality of time difference plots and analyzing how the widths of the time difference plots vary over time.

21. A computer program embodied on a computer readable medium, the computer program comprising computer readable program code for:

initiating a plurality of tests of a plurality of actuators in a process control system, wherein the tests include providing varying control signals to the actuators and wherein the actuators comprises actuators in a paper sheet production machine operable to manufacture a paper sheet;

analyzing responses of the actuators to the varying control signals to determine if the actuators are suffering from one or more faults; and providing at least one notification identifying any identified faults;

wherein each actuator is associated with one of a plurality of pressurization curves;

wherein each test is associated with a different set of scaling factors for the pressurization curves; and wherein the computer readable program code for analyzing the responses of the actuators comprises computer readable program code for identifying an anomaly in a trend of the scaling factors.

* * * * *

UNITED STATES PATENT AND TRADEMARK OFFICE

CERTIFICATE OF CORRECTION

PATENT NO. : 7,496,465 B2
APPLICATION NO. : 11/482884
DATED : February 24, 2009
INVENTOR(S) : Salvatore Chirico et al.

It is certified that error appears in the above-identified patent and that said Letters Patent is hereby corrected as shown below:

In Column 19, line 50, claim 5 delete “the” and add --a--;
In Column 20, line 7, claim 6 before “sheet” add --paper--;
In Column 20, line 8, claim 6 before “sheet” add --paper--;
In Column 20, line 20, claim 9 delete “tune” add --time--;
In Column 20, line 61, claim 13 before “sheet” add --paper--;
In Column 20, line 62, claim 13 before “sheet” add --paper--;
In Column 21, line 52, claim 18 before “sheet” add --paper--.

Signed and Sealed this

Fourteenth Day of April, 2009

JOHN DOLL
*Acting Director of the United States Patent and Trademark Office*